US012008567B2

(12) United States Patent
Shi et al.

(10) Patent No.: US 12,008,567 B2
(45) Date of Patent: Jun. 11, 2024

(54) GRAPH TRANSFORMATION BASED ON DIRECTED EDGES

(71) Applicant: PAYPAL, INC., San Jose, CA (US)

(72) Inventors: Jia Shi, Shanghai (CN); Lin Zhu, Shanghai (CN); Jie Huang, Shanghai (CN)

(73) Assignee: PayPal, Inc., San Jose, CA (US)

( * ) Notice: Subject to any disclaimer, the term of this patent is extended or adjusted under 35 U.S.C. 154(b) by 160 days.

(21) Appl. No.: 17/666,139

(22) Filed: Feb. 7, 2022

(65) Prior Publication Data

US 2023/0252469 A1 Aug. 10, 2023

(51) Int. Cl.
*G06Q 20/40* (2012.01)
*G06F 16/901* (2019.01)

(52) U.S. Cl.
CPC ....... *G06Q 20/401* (2013.01); *G06F 16/9024* (2019.01); *G06F 16/9027* (2019.01); *G06Q 20/40* (2013.01)

(58) Field of Classification Search
None
See application file for complete search history.

(56) References Cited

U.S. PATENT DOCUMENTS

| | | | | |
|---|---|---|---|---|
| 2017/0364699 A1* | 12/2017 | Goldfarb | ............. | G06F 16/2282 |
| 2018/0018645 A1* | 1/2018 | Rand | ................. | G06Q 20/3672 |
| 2018/0205552 A1* | 7/2018 | Struttmann | ............ | G06F 21/78 |
| 2020/0394707 A1* | 12/2020 | Guo | ...................... | G06Q 40/00 |
| 2021/0174144 A1* | 6/2021 | Chen | ..................... | G06N 20/00 |

\* cited by examiner

*Primary Examiner* — William J Jacob
(74) *Attorney, Agent, or Firm* — Haynes and Boone, LLP

(57) ABSTRACT

Methods and systems are presented for analyzing transactions conducted through user accounts with an online service provider based on graph analysis. A graph is generated based on a set of seed accounts that are determined to be involved in suspicious activities. The graph includes a set of seed nodes representing the seed accounts, and a set of nodes representing user accounts that are connected to the set of seed accounts in downstream transactions. A random walk traversal based on multiple dimensions is performed on the graph to determine nodes that are closely related to the set of seed nodes. Transactions conducted through the seed accounts and accounts corresponding to nodes that are closely related to the set of seed nodes are analyzed to detect any malicious activities. The graph may also be presented according to a layered hierarchical structure for better visualization of transaction flows through the accounts.

20 Claims, 21 Drawing Sheets

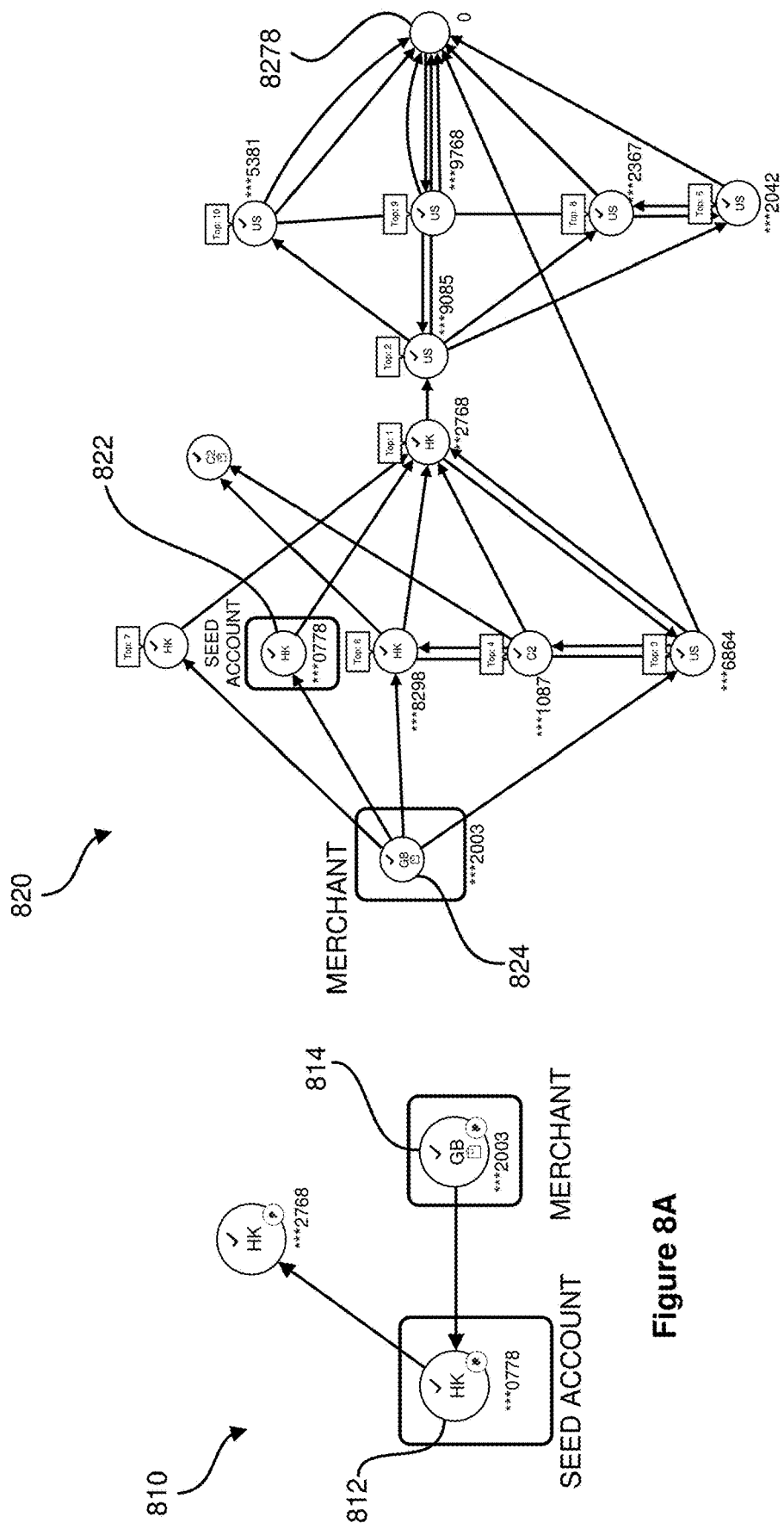

GRAPH TRANSFORMATION BASED ON DIRECTED EDGES

BACKGROUND

The present specification generally relates to data structures, and more specifically, to providing a data structure for efficiently analyzing electronic transactions according to various embodiments of the disclosure.

RELATED ART

An online service provider may enable users to conduct transactions (e.g., purchase transactions, payment transactions, cryptocurrency transactions, etc.) through their user accounts with the online service provider via a transaction processing platform. Through the use of the transaction processing platform, users may conduct various types of transactions seamlessly, such as performing a purchase with a merchant, transferring funds (or other types of asset such as data, rights, etc.) to a friend and/or a vendor, selling goods, and the like. While these services benefit legitimate users tremendously, malicious users may also use the transaction processing platform to conduct illegal activities. For example, malicious users may conduct money laundering activities by transferring funds (or other types of assets) through multiple user accounts with the online service provider. In order to evade detection of a source of a particular fund, malicious users may iteratively transfer the particular fund (or portions of the particular fund) to different user accounts before withdrawing the particular fund from the transaction processing platform. In certain cases, one or more portions of the particular fund may be transferred in a cyclical manner to further evade detection.

As such, the online service provider may analyze individual transactions, or a collection of transactions as a whole, to detect suspicious activities conducted through its transaction processing platform. However, as the transaction flows of funds become increasingly more complex (e.g., involving an increasing number of user accounts, an increasing number of transactions, and/or an increasing number of different types of transactions), analyzing the transaction flows has become more challenging. As such, there is a need for providing an improved way of presenting and analyzing complex transaction flow data for detection of suspicious transaction activities.

BRIEF DESCRIPTION OF THE FIGURES

FIG. 8A illustrates another graph that shows one-hop transactions from one or more seed accounts according to an embodiment of the present disclosure;

FIG. 8B illustrates another graph that shows multiple-hop transactions from the one or more seed accounts after performing a random walk traversal analysis according to an embodiment of the present disclosure;

Figure 1:
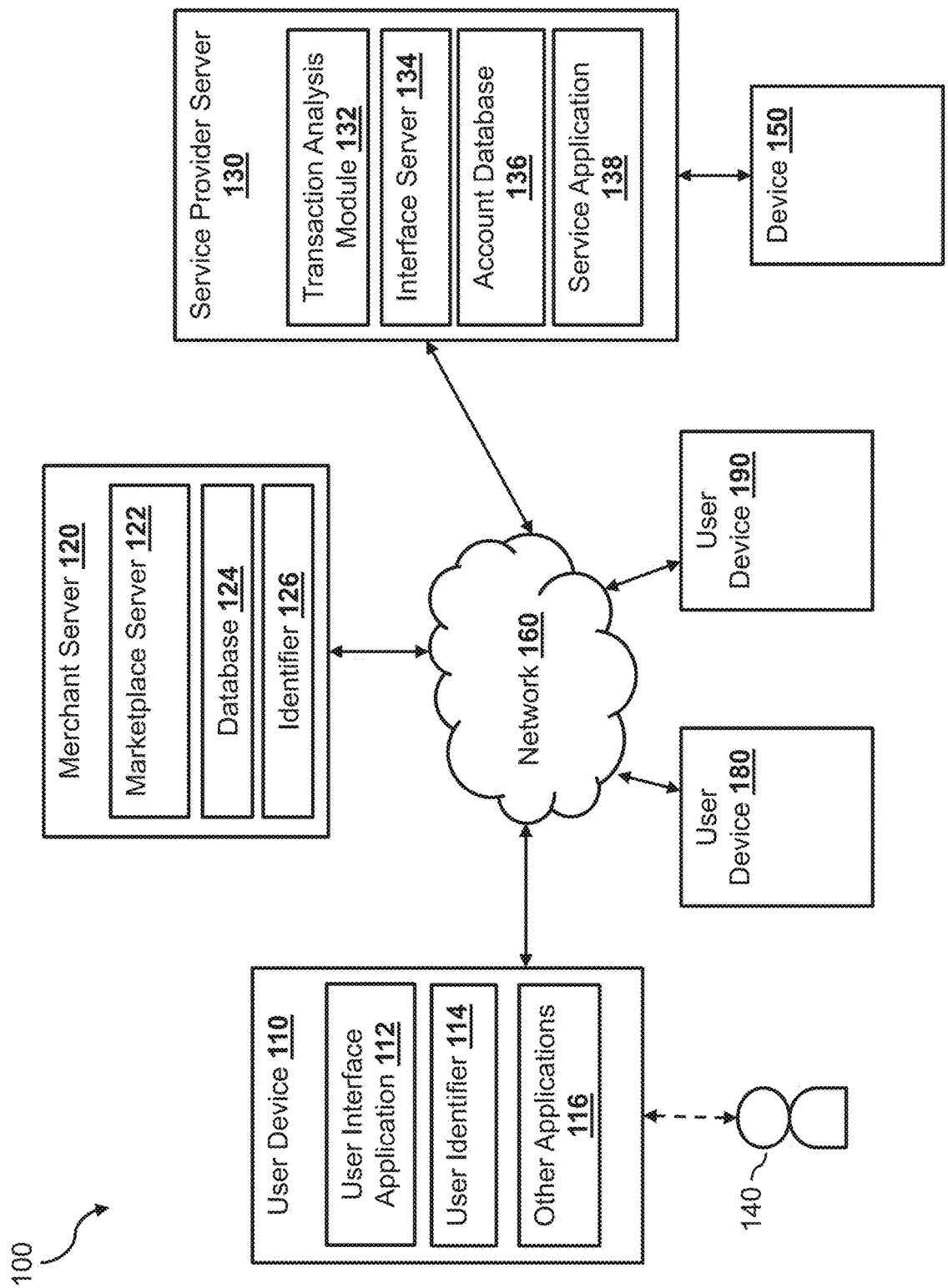
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for using a multi-dimensional random walk graph traversal technique to detect patterns in transactions among users of a service provider and for providing a hierarchical presentation of a graph that represents the detected patterns. As discussed above, complex transaction flows can be challenging to analyze and illustrate in a clear and useful manner. In particular, malicious users who use a transaction processing platform of an online service provider to conduct malicious activities tend to use long and complex transaction flows (e.g., that may include multiple hops of transactions and involve multiple user accounts before funds are being withdrawn, etc.) in an attempt to avoid detection of illegal activities. As defined herein, the term "funds" can be used to mean monetary assets such as different types of currencies, or other types of assets such as data, access rights, etc.

To identify accounts that are being used by malicious users to conduct malicious activities, the service provider may use complex algorithms and/or machine learning models to analyze each individual user account based on transactions conducted through the user account. However, it is a challenge to comprehensively analyze an account based solely on transactions associated with the account without taking into considerations other related accounts (e.g., accounts in the downstream or upstream transaction flows from that account), as the account may collude with multiple other accounts in conducting the malicious activities, as discussed herein. In these scenarios, transactions that are conducted through each individual account may appear to be innocuous. However, the transactions among the multiple colluding accounts, when viewed as a whole, may be identified as criminal activities (e.g., money laundering, etc.). Conventionally, an investigator may identify one or more accounts that are likely involved in malicious activities (also referred to as "seed accounts") based on analysis on the account level. The investigator may then trace transaction flows based on the seed accounts (e.g., downstream or upstream transaction flow from the seed accounts, etc.). However, when the number of related accounts and transactions are large and the transaction flows are complex, it becomes challenging for the investigator to detect patterns within the transaction flows. For example, a seed account may conduct transactions with tens or hundreds of other accounts directly. Each of those other accounts may, in turn, conduct transactions with another tens or hundreds of other accounts. Thus, analyzing transaction flows from the seed accounts that involve multiple hops becomes a complex problem that requires large amounts of computing resources, such as power and time.

A transaction flow is defined herein as one or more series of transactions (e.g., also referred to as "hops") that are originated from a particular seed user account. Each series of transactions may include multiple transactions (multiple hops) in sequence. For example, a series of transactions may include a transaction that transfers funds from a first user account to a second user account, a transaction that transfers funds from the second user account to a third user account, a transaction that transfers funds from the third user account to a fourth user account, and so forth. A series of transactions may end when funds are withdrawn from a user account, where the funds exit an environment of the online service provider (e.g., withdrawing to another banking institute external to the online service provider).

A complex transaction flow may include multiple layers of transactions—that is, each series of transactions within the transaction flows include multiple steps of transactions before the funds exit the environment of the online service provider. A complex transaction flow may also include cyclical payments where funds that were transferred out of a particular user account may subsequently be transferred back to the particular user account. For example, malicious users may use a source user account with the online service provider to distribute portions of particular funds to a first set of intermediate user accounts with the online service provider. Instead of withdrawing the portions of the particular funds from the first set of user accounts, the malicious users may use the first set of user accounts to transfer the corresponding portions of the particular funds to a second set of user accounts. The portions of the particular funds may be continued to be transferred (and/or split) among different user accounts (in one or more additional layers of transactions), before the particular funds exit the environment of the online service provider (e.g., the particular funds being withdrawn from one or more user accounts with the online service provider).

In addition to transferring the particular funds among user accounts with the online service provider multiple times, at least some portions of the particular funds may involve cyclical transactions. For example, one or more portions of the particular funds may be first transferred to a first user account. The one or more portions of the particular funds may then be transferred from the first user account to one or more other user accounts (e.g., a second user account, a third user account, etc.). After transferring the one or more portions of the particular funds to the one or more other user accounts, the one or more portions of the particular funds may be transferred back to the first user account before they are withdrawn.

Tracing and analyzing these types of complex transaction flows have been historically challenging. Conventionally, a networked graph may be used in assisting the presentation and analyzing of transaction flows. The networked graph may be constructed by generating different nodes to represent different user accounts with the online service provider. An edge may be generated between two nodes to represent a transaction conducted between two corresponding user accounts. The edge may be directional to represent a directional flow of funds associated with the transaction. Thus, a transaction that transfers funds from a first user account to a second user account may be represented by a directional edge that points from a first node representing the first user account to a second node representing the second user account.

The networked graph may be presented on a graphical user interface to illustrate one or more transaction flows within the environment of the online service provider. A human analyst or a computer system, such as a transaction analysis system, may analyze the networked graph (e.g., by traversing the nodes in the networked graph using the directional edges) to detect suspicious activities. However, as the transaction flows become increasingly more complex, it becomes more challenging to analyze the transaction flows using the networked graph. For example, when many of the user accounts have been involved in both inbound (e.g., receiving payments) and outbound (e.g., transferring payments) transactions, it is challenging to trace a transaction flow associated with any one particular fund within the networked graph, as most nodes are connected to inbound and outbound edges. Furthermore, the connectedness (each node being connected with many other nodes in one or both directions) also makes it difficult to detect cyclical payments using the networked graph.

As such, according to various embodiments of the disclosure, a transaction analysis system may use a multi-dimensional random walk traversal to detect transaction patterns corresponding to malicious activities within a graph. When performing a random walk traversal of a graph, the transaction analysis system may start traversing the graph from a starting node. In some embodiments, the transaction analysis system may select a node that represents a seed account as the starting node. The transaction analysis system may begin traversing the graph from the starting node. At each node during the traversal, the transaction analysis system may determine whether to terminate at the current node and end the traversal based on a termination factor. The termination factor may be represented as a probability, such that the transaction analysis system may terminate at any given node with a x probability and may move on to a connected node with (1-x) probability, where x can be a decimal number representing a percentage. In one example, at each node, the transaction analysis system may obtain a random number (e.g., between 0 and 1). If the random number is smaller or equal to x, the transaction analysis system may decide to terminate at the current node. On the other hand, if the random number is larger than x, the transaction analysis system may decide to move to a next node. In some embodiments, the transaction analysis system may determine the termination factor prior to performing the random walk traversal of the graph, and may use the same termination factor to determine whether to terminate at each node that the transaction analysis system traverses during the random walk traversal. In some embodiments, the transaction analysis system may modify the termination factor during the random walk traversal. For example, the transaction analysis system may progressively increase the termination factor such that the farther along the transaction analysis system traverses in the graph, the more likely that the transaction analysis system will terminate at a given node.

In some embodiments, each connection (edge) that connects a current node to one or more connecting nodes may be associated with a weight, representing how likely the transaction analysis system may move to that connected node. The higher the weight, the more likely the transaction analysis system may move to that connected node via the corresponding connection during the random walk traversal. For example, the weight of the connection may be determined based on the total number of transactions conducted between an account represented by the connected node and the account represented by the current node, such that the more transactions that have been conducted between the two accounts, the more likely the transaction analysis system would move to the corresponding connected node during the random walk traversal of the graph.

As the transaction analysis system traverses each node, the transaction analysis system may first determine whether to terminate at the current node based on the termination factor. The current iteration of the random walk traversal may end at the current node if the transaction analysis system determines to terminate at the current node. If the transaction analysis system determines to not terminate, the transaction analysis system may access all the nodes that are connected to the current node. The transaction analysis system may determine which of the connected node to move to, based on the weights assigned to the connections that connect the current node with the connected nodes.

Thus, based on the termination factor and the weights assigned to each connection in the graph, the transaction analysis system may terminate at a particular node in the graph after performing a random walk traversal. In some embodiments, the transaction analysis system may perform the random walk traversal a number of times (e.g., 50, 100, 1,000, etc.). Each time the transaction analysis system performs the random walk traversal, the transaction analysis system may record the node where the transaction analysis system terminates during the traversal. The transaction analysis system may terminate at different nodes from different iterations of the random walk traversal. However, based on the termination factor and the weights assigned to the different nodes, the transaction analysis system may terminate at some nodes more often than other nodes.

In some embodiments, the transaction analysis system may rank the nodes based on the number of times that the transaction analysis system terminates at the nodes during the iterations of the random walk traversal. The transaction analysis system may determine a higher ranking for a first node than a second node when the transaction analysis system terminates at the first node more often than the second node during the iterations of the random walk traversal. The transaction analysis system may determine that the nodes that rank higher than a threshold (e.g., ranks 10 or above, 5 or above, etc.) are closely related to the starting node, and may determine that the accounts represented by those nodes were involved in conducting malicious activities with the seed account represented by the starting node of the random walk traversal.

The random walk traversal provides insightful indications of which associated accounts are closely related to the seed account, which may be used by the transaction analysis system to perform further analyses and actions to the accounts (e.g., the seed account and the closely related accounts). For example, after determining the accounts that are related to the seed account, the transaction analysis system may focus the analysis on the transactions conducted by the seed account and the closely related accounts, and may ignore transactions conducted by other accounts. Focusing only on transactions conducted by the selected few accounts that are determined to be closely related to each other may enable the transaction analysis system to determine, using less computing resources, transaction patterns correspond to malicious behavior (e.g., money laundering, other criminal activities, etc.) that may be difficult to detect when transactions associated with individual accounts are analyzed separately or when transactions associated with all connected accounts are analyzed indiscriminately.

While the random walk traversal is useful in detecting patterns associated with closely related accounts as discussed herein, it is limited to using a single dimension in analyzing the closeness between accounts since each node in the graph is assigned with only a single weight. In some embodiments, the transaction analysis system may enable the performance of random walk traversal based on multiple dimensions by introducing additional factors, in addition to the termination factor, during the random walk traversal. For example, the transaction analysis system may determine that, in addition to the total number of transactions performed by two accounts, the total amount associated with the transactions performed by the two accounts is also a relevant factor in determining the closeness between the two accounts. In this example, for each connection between two nodes, the transaction analysis system may determine two weights—a first weight associated with a first factor, such as the total number of transactions conducted between two accounts represented by the two connecting nodes via the connection, and a second weight associated with a second factor, such as the total amount associated with the transactions conducted between the two accounts. While only two factors are used in this example to illustrate the multi-dimensional random walk traversal mechanism, additional factors (e.g., recency of transactions being conducted, a ratio of transactions being conducted with the connecting node in comparison with transactions being conducted with other node, etc.) such as three factors, five factors, etc. can be implemented as well using this technique.

In some embodiments, in addition to the termination factor, the transaction analysis system may also determine a dimension factor for the random walk traversal. Similar to the termination factor, the dimension factor may be represented as a probability (e.g., a percentage), such that at any given node, the transaction analysis system may use a first dimension to determine which connected node to move to with y probability and may use a second dimension to determine which connected node to move to with (1-y) probability, where y may be a decimal number representing a percentage. The dimension factor may also be configured to determine probabilities for any other numbers of dimensions (e.g., 3 dimensions, 5 dimensions, etc.).

As such, at any node during a random walk traversal, the transaction analysis system may first determine whether to terminate at the current node based on the termination factor. This iteration of the random walk traversal may be terminated at the current node if the transaction analysis system determines to terminate based on the termination factor. If the transaction analysis system determines to not terminate, the transaction analysis system may determine which of the dimensions to use for moving to the next connected node based on the dimension factor. If the transaction analysis system determines to use the first dimension (e.g., the total number of transactions) for traversing based on the dimension factor, the transaction analysis system may determine which connected node to move to based on the weights associated with the first dimension. On the other hand, if the transaction analysis system determines to use the second dimension (e.g., the total amounts) for traversing based on the dimension factor, the transaction analysis system may determine which connected node to move to based on the weights associated with the second dimension. This way, multiple dimensions can be considered for determining closeness between accounts.

Furthermore, using the additional dimension factor for performing the random walk traversal enables easy re-configuration of the random walk traversal. For example, the transaction analysis system may easily adjust the dimension factor at the beginning of each random walk traversal to change the importance level of each dimension. If the transaction analysis system determines that the first dimension should be used more often, the dimension factor can be adjusted in favor of the first dimension (e.g., increasing y, etc.). Similarly, if the transaction analysis system determines that the second dimension should be used more often, the dimension factor can be adjusted in favor of the second dimension.

In some embodiments, before performing the iterations of random walk traversal on the graph, the transaction analysis system may pre-process the graph by eliminating one or more large transaction nodes from the graph. One or more nodes in the graph may represent a large volume merchant (e.g., a merchant account that has conducted transactions with a large number of other accounts that exceeds a threshold, such as 50, 100, 1,000, etc.). The large transaction node representing the large volume merchant may be connected with a large number of other nodes based on the transactions conducted by the merchant account. Since the large transaction node representing the large volume merchant is connected a large number of nodes, the probability that the transaction analysis system would reach any particular one of those nodes connected to the large transaction node is extremely slim. On the other hand, due to the connectedness of the large transaction node, the probability that the transaction analysis system would reach the large transaction node would be disproportionately large, even though the large volume merchant likely is not involved in any malicious activities. Furthermore, having the large transaction node and the connected nodes connecting to the large transaction node in the graph increases the complexity of the random walk traversal. However, while the large volume merchant likely is not involved in any malicious (or illegal) activities, the merchant may be used by malicious users in a manner that facilitates the malicious activities.

As such, in some embodiments, the transaction analysis system may generate a rank graph that excludes the large transaction node and all of its downstream connections (e.g., the nodes that are directly connected to the large transaction node in a downstream flow). The elimination of such nodes and edges reduces the complexity of the random walk traversal without sacrificing the accuracy of the graph. In some embodiments, the transaction analysis system may also generate a support graph that only excludes the downstream connections from the large transaction node (e.g., nodes that are directly connected to the large transaction node in the downstream flow), but retaining the large transaction node. The transaction analysis system may then perform the iterations of the random walk traversal on the rank graph. In some embodiments, the transaction analysis system may also perform the random walk traversal on the support graph in addition to the rank graph. However, when performing the random walk traversal on the support graph, the transaction analysis system would not rank the large transaction node. After performing the random walk traversal and determining the ranking of the different nodes in the rank graph (and the support graph), the transaction analysis system may merge the rank graph with the support graph, such that the large transaction node is included in the merged graph without affecting the random walk traversal. The inclusion of the large transaction node back into the merged graph may enable the transaction analysis system to analyze the transactions among the ranked nodes and the large transaction node, and may detect transaction patterns among those nodes.

The transaction analysis system may perform additional analyses to the accounts based on the ranking of the corresponding nodes in the graph. In some embodiments, the transaction analysis system may analyze the transactions conducted by the accounts corresponding to the nodes having a ranking higher than a threshold (e.g., 20 or higher, 10 or higher, 5 or higher, etc.). Since more than one seed account may be selected for the analysis, the nodes in the graph may be ranked for different seed accounts. The multiple seed nodes corresponding to the multiple seed accounts and the different ranked nodes based on the different seed nodes may be analyzed as a whole to detect patterns that correspond to malicious activities. This way, complex transaction flows that involve multiple layers of transactions and multiple accounts may be detected by the transaction analysis system. Once a pattern that corresponds to malicious activities is detected, the transaction analysis system may perform further actions to accounts that are involved in the pattern. For example, the transaction analysis system may suspend the accounts, re-configure a security setting of the accounts to restrict certain types of transactions being conducted through those accounts, or other actions.

The multi-dimensional random walk traversal of the graph enables the transaction analysis system to identify accounts that are closely related to the seed account, and perform further analysis on transactions conducted through the identified accounts. In some embodiments, the transaction analysis system may present the graph on a user interface to allow an investigator to manually inspect the details of the transaction flows illustrated in the graph. However, since the graph is generated based on connecting nodes with edges to represent different transactions, when the transaction flows are complex, the graph that is generated may include many edges (including cross edges, edges that go both directions between two nodes, etc.) that makes it difficult for the investigator to visualize and follow any one of the transaction flows represented in the graph.

As such, in another aspect of the disclosure, the transaction analysis system may generate and present a hierarchical presentation of a graph that represents the detected transaction patterns in a clearer manner. As discussed herein, the graph (e.g., the rank graph, the support graph, and the merged graph) is usually generated to include nodes representing user accounts of the service provider and edges that connect nodes representing transactions between the user accounts, without any hierarchical structure. When the transaction flows that are represented in the graph become complicated (e.g., including cyclical transactions, bi-directional transactions between user accounts, etc.), the graph may become convoluted, such that it is difficult for the investigator to understand the transaction flows represented in the graph. In some embodiments, the transaction analysis system may organize the nodes of the graph in a hierarchical structure having multiple layers and present the layered hierarchical structure to improve the presentation of the transaction flows.

To generate the layered hierarchical structure, the transaction analysis system may first select a node (also known as a seed node) in the graph where the generation of the layered hierarchical structure may begin. In some embodiments, the transaction analysis system may select a node that represents one of the seed accounts as the seed node. If there are multiple seed accounts, the transaction analysis system may randomly select a seed account or may select a seed account having the fewest number of upstream transactions. However, it is contemplated that any node within the graph (the node may or may not represent a seed account from the previous random walk traversal process) can be selected as the seed node for generating the layered hierarchical structure.

The transaction analysis system may assign the seed node to a first layer of the layered hierarchical structure. The transaction analysis system may then assign the other nodes in the graph to different layers in the layered hierarchical structure based on a traversal of the graph from the seed node. In some embodiments, the transaction analysis system may perform a breadth-first search (BFS) in the graph from the seed node. Each time the transaction analysis system expands a level of search in the BFS, the transaction analysis system records the nodes that the transaction analysis system reaches at that level. Since cyclical transactions exist in the graph, each node may be recorded in one or more levels. Furthermore, each node may be recorded in the same level more than once (e.g., the transaction analysis system reaches the same node multiple times from different nodes during an expansion of the BFS). After completing the traversal of the graph, the transaction analysis system may assign each node to a layer in the layered hierarchical structure that corresponds to the most frequently recorded search level associated with the node. The assignment becomes the initial layer assignments for the nodes.

After the initial assignments of nodes to the different layers, the transaction analysis system of some embodiments may iteratively reassign a node to a different layer based on a goal of minimizing reverse edges in the graph. An edge is a reverse edge when the edge connects a node from a higher layer to a node to the lower layer (e.g., from Layer 3 to Layer 2), or when the edge connects a first node to a second node in the same layer without having a corresponding opposite edge that connects the second node back to the first node. However, a directional edge is not a reverse edge when the edge connects a first node to a second node in the same layer and a corresponding directional edge exists in the opposite direction (e.g., connecting the second node to the first node).

The transaction analysis system may identify a node within the graph that has the highest number of reverse edges connecting from that node to other nodes. The transaction analysis system may then explore different positions for that node in the layered hierarchical structure. For example, the transaction analysis system may move the node up one or more layers, move the node down one or more layers, move the node in between two layers (e.g., creating a new layer for the node in between two existing layers in the layered hierarchical structure), and may determine a position for the node that provides the minimum number of reverse nodes in the graph.

The transaction analysis system may iteratively identify and reassign nodes until the transaction analysis system determines that the identified node can no longer be moved (e.g., moving the identified node to any other position would result in the same or a higher number of reverse edges). In some embodiments, the transaction analysis system may transform the presentation of the graph based on the layered hierarchical structure. For example, the transaction analysis system may re-arrange the positions of the nodes in the graph according to their assigned layers to improve the visibility of the transaction flows (how series of transactions are conducted) within the graph. By minimizing reverse edges, most of the edges (which represent the flow of funds) are pointed in the same direction from a lower layer to a higher layer in the layered hierarchical structure, which makes it easier for an investigator to follow the transaction flows (e.g., how the funds are moved among the accounts).

In some embodiments, to further analyze the transaction flows presented in the graph, the transaction analysis system may label the nodes based on the layers assigned to the nodes. For example, the transaction analysis system may determine three different labels for the nodes: a source node, an intermediate node, and a withdrawal node. The node(s) that are assigned to the lowest layer (e.g., the first layer) of the layered hierarchical structure may be labeled as the source node(s) as the corresponding account(s) provide the funds in the transaction flow(s), the node(s) that are assigned to the highest layer of the layered hierarchical structure may be labeled as the withdrawal node(s) as the corresponding account(s) withdraw the funds in the transaction flow(s), and the node(s) that are assigned to any other layers of the layered hierarchical structure may be labeled as the intermediate node(s). In some embodiments, the transaction analysis system may also present the nodes (and/or the edges) in the graph differently based on their assigned layers. For example, the transaction analysis system may present the source node(s) in a first manner (e.g., in a first color, in a first size, etc.), may present the intermediate node(s) in a second manner (e.g., in a second color, in a second size, etc.), and may present the withdrawal node(s) in a third manner (e.g., in a third color, in a third size, etc.).

The transaction analysis system may then analyze the corresponding accounts, for example, using the techniques disclosed herein to detect any transaction patterns that correspond to malicious activities, but with the aid of the labeling of the nodes. As such, the re-organization of the graph based on a layered hierarchical structure not only provides an improved visual tool for an investigator to manually inspect the transaction flows, it also allows the transaction analysis system to improve on analyzing and detecting malicious activities conducted through user accounts of the service provider.

FIG. 1 illustrates a networked system 100, within which the transaction analysis system may be implemented according to one embodiment of the disclosure. Note that the present techniques may be applied in many different computing and technological environments, however, and are not limited to those shown in the figures. The networked system 100 includes a service provider server 130, a merchant server 120, user devices 110, 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online transaction with the merchant server 120 via websites hosted by, or mobile applications associated with, the merchant server 120. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130, and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account (e.g., and a particular profile) maintained by the service provider server 130.

In various implementations, the user 140 is able to input data and information into an input component (e.g., a keyboard) of the user device 110. For example, the user 140 may use the input component to interact with the UI application 112 (e.g., to retrieve content from third-party servers such as the merchant server 120, to provide inputs related to a goal to the service provider server 130, etc.).

Each of the user devices 180 and 190 may include similar hardware and software components as the user device 110 to enable their respective users to interact with the merchant server 120 and the service provider server 130 through the user devices 180 and 190. For example, the users of the user devices 110, 180, and 190 may use the respective devices to conduct electronic transactions through different user accounts of the service provider server 130.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for viewing, accessing, and/or purchasing, and process payments for the purchases. As shown, the merchant server 120 may include a merchant database 124 for identifying available items, which may be made available to the user devices 110, 180, and 190 for viewing and purchase by the user.

The merchant server 120, in one embodiment, may include a marketplace application or server 122, which may be configured to provide information (e.g., displayable content) over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for access and/or purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between the users of the user devices 110, 180, and 190, and one or more merchants or other types of payees. As such, the service provider server 130 may include a service application 138, which may be adapted to interact with the user devices 110, 180, and 190, and/or the merchant server 120 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 140, users of the user devices 180 and 190, or a merchant associated with the merchant server 120, etc.) may access a user account associated with the user and access various services offered by the service provider server 130, by generating HTTP requests directed at the service provider server 130. In some embodiments, the fragment module integration framework may be implemented within or in association with the interface server 134.

The service provider server 130, in one embodiment, may be configured to maintain one or more user accounts and merchant accounts in an account database 136, each of which may be associated with a profile and may include account information associated with one or more individual users (e.g., the user 140 associated with user device 110, users associated with the user devices 180 and 190) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a transaction analysis module 132 that implements the transaction analysis system as discussed herein. The transaction analysis module 132 may access transaction information associated with transactions conducted through user accounts of the online service provider that is stored in the account database 136. Based on the transaction information, the transaction analysis module 132 may identify one or more seed user accounts that satisfy a set of risk criteria, and may generate a graph that represents downstream transaction flows from the seed user accounts. In some embodiments, the transaction analysis module 132 may determine accounts that are closely related to the seed user accounts and likely involve in conducting malicious activities with the seed user accounts based on a multi-dimensional random walk traversal of the graph. The transaction analysis module 132 may further analyze the transactions conducted through the seed user accounts and accounts that are determined to be closely related to the seed user accounts. In some embodiments, to assist in analyzing the transaction flows and/or to provide a meaningful visual presentation of the transaction flows to an investigator, the transaction analysis module 132 may modify the graph based on a layered hierarchical structure. In particular, the transaction analysis module 132 may iteratively assign nodes to different layers in a layered hierarchical structure with the goal of minimizing reverse edges in the graph. The transaction analysis module 132 may then re-arrange the nodes in the graph based on the layers to which the nodes are assigned. The transaction analysis module 132 may present the modified graph on a user interface (e.g., on a device 150 connected to the service provider server 130), and/or using the layered hierarchical structure to perform further analysis of the transaction flows. If the transaction analysis module 132 determines that the transactions conducted through one or more of the accounts correspond to malicious activity, the transaction analysis module 132 may perform actions to the accounts to prevent additional losses.

Figure 2:
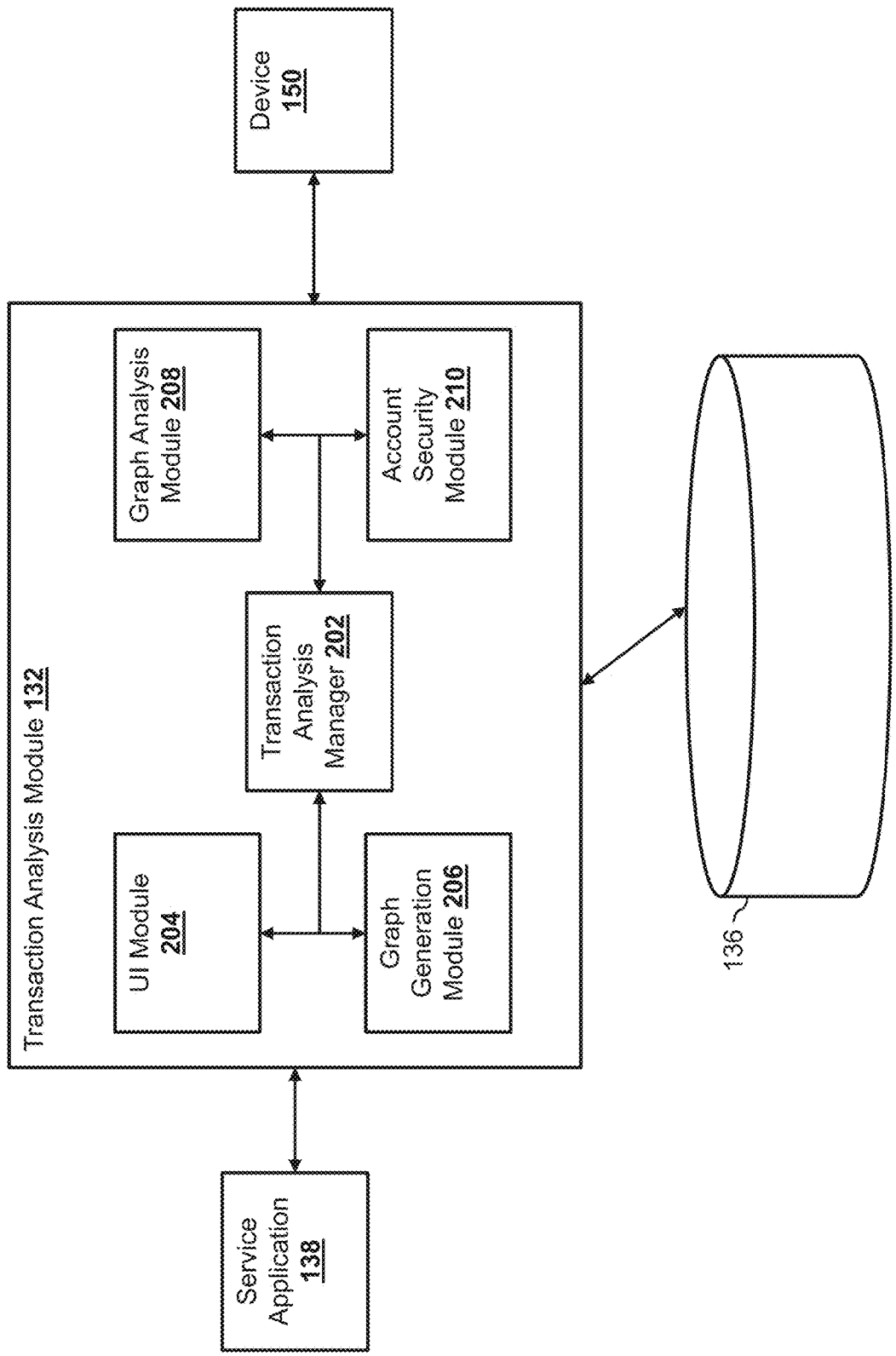
FIG. 2 is a block diagram illustrating a transaction analysis module according to an embodiment of the present disclosure.

FIG. 2 illustrates a block diagram of the transaction analysis module 132 according to an embodiment of the disclosure. The transaction analysis module 132 includes a transaction analysis manager 202, a user interface (UI) module 204, a graph generation module 206, a graph analysis module 208, and an account security module 210. In some embodiments, the transaction analysis manager 202 may be configured to analyze transaction data associated with transactions conducted through user accounts of the online service provider. For example, the transaction analysis manager 202 may analyze the transaction data on a periodic basis (e.g., every day, every week, every month, etc.), in order to identify suspicious activities and/or user accounts that are likely involved in the suspicious activities. Once the user accounts that are likely involved in the suspicious activities are identified, the account security module 210 may perform one or more actions on the identified user accounts. For example, the account security module 210 may lock and/or disable the identified user accounts. The account security module 210 may modify a security setting associated with each of the identified user accounts, such that transactions (or transactions that satisfy a set of risk criteria such as above a predetermined amount, etc.) conducted through the identified user accounts will be denied, and/or additional authentication steps are required to access the identified user accounts.

In some embodiments, the transaction analysis module 132 may detect the suspicious activities and/or the user accounts that are likely involved in the suspicious activities using the techniques disclosed herein. For example, the transaction analysis manager 202 may first analyze the user accounts on an account-by-account basis, such that the transactions conducted through a single user account are analyzed in an isolated manner. The transaction analysis manager 202 may determine whether the user account matches a profile that corresponds to suspicious behavior based on the transactions conducted through the user account. The accounts that the transaction analysis manager 202 determines to match the profile may be referred to as "seed accounts." In some embodiments, the UI module 204 may provide a user interface that enables a user (e.g., an investigator associated with the service provider) to select one or more accounts of the service provider as the seed accounts. As discussed herein, in many instances, multiple user accounts may collude in the performance of malicious activities. However, it is difficult to identify all of the accounts that work together in the performance of malicious activities because (1) the transactions conducted through a single account, when viewed in isolation, may not appear to be related to suspicious behavior and (2) some of these accounts may perform legitimate transactions with other legitimate user accounts to further obfuscate their suspicious behavior.

As such, after identifying one or more seed accounts, the transaction analysis module 132 may use the multi-dimensional random walk traversal techniques to identify other accounts that are closely related to the one or more seed accounts. In some embodiments, the graph generation module 206 may generate a graph based on the identified one or more seed accounts. For example, the graph generation module 206 may create a node (e.g., a seed node) for each of the one or more seed accounts. For each seed account of the one or more seed accounts, the graph generation module 206 may determine downstream transactions (and/or upstream transactions) conducted through the seed account, and create nodes representing the recipient accounts associated with the transactions, and connect the seed node representing the seed account to the newly created nodes using directional edges representing a flow of funds in the corresponding transactions. The graph generation module 206 may continue to create new nodes and edges by tracking downstream transactions (and/or upstream transactions) from accounts corresponding to the nodes in the graph. Since cyclical transactions may exist in the transaction flows, the graph generation module 206 may create an edge that is directed to a node that already exists in the graph. If a node already exists for a user account, the graph generation module 206 may connect a directional edge to the existing node instead of creating a new node. Furthermore, since an account may conduct a transaction (e.g., a payment transfer transaction, etc.) with another account multiple times, multiple directional edges may be created from one node to another node. In some embodiments, to simplify the graph, all of the directional edges from one node to another node may be combined to form a single directional edge. That directional edge may have an attribute (e.g., a thickness, a number associated with the edge, etc.) that represents the number of transactions. As such, at most two directional edges (e.g., in opposite directions) may exist between two nodes in the graph.

The size of the graph may be defined by the number of hops (the number of downstream transactions) being tracked by the graph generation module 206. If no artificial stop is in place, the graph generation module 206 may continue to expand the graph (e.g., creating new nodes and edges based on the downstream transactions) until all of the transaction flows are exhausted. The larger the graph, the more data can be analyzed to detect patterns of suspicious activities. However, a large graph may also lengthen the analysis process. Thus, the graph generation module 206 may determine a size of the graph for each analysis that balances the accuracy and the speed performance of the analysis. In some embodiments, the graph generation module 206 may determine the number of hops to be included in the graph based on an input provided by a user through the user interface generated by the UI module 204. In some embodiments, the graph generation module 206 may determine the number of hops to be included in the graph based on different factors, such as a number of seed nodes in the graph, a number of downstream transactions conducted through the seed accounts, attributes of the seed accounts (e.g., currency used in transactions through the seed accounts, locations of devices associated with the seed accounts, amounts in the transactions conducted through the seed accounts, etc.).

The generated graph may represent downstream transaction flows from the seed accounts. The nodes represent user accounts that are involved in the downstream transaction flows, and the directional edges represent the transactions conducted between user accounts in the downstream transaction flows. In some embodiments, the graph generation module 206 may assign weights to each of the directional edges to represent attributes of the corresponding transactions. In some embodiments, in order to represent the transactions in a more comprehensive manner, weights in multiple dimensions may be assigned to each of the directional edges. For example, the graph generation module 206 may determine, for each edge connecting a first node to a second node, a first weight corresponding to a first dimension and a second weight corresponding to a second dimension. The first dimension may correspond to a total number of transactions being conducted from a first account represented by the first node to a second account represented by the second node. The second dimension may correspond to the total transaction amount associated with all of the transactions being conducted from the first account to the second account. While only two dimensions are used in this example, additional dimensions may be used to describe the transactions, and additional weights corresponding to the additional dimensions may be assigned to the corresponding edges in the graph. The weights assigned to the edges may be used during the multi-dimensional random walk traversal of the graph.

The graph analysis module 208 may determine parameters for performing the multi-dimensional random walk traversal of the graph. The parameters may include a termination factor representing a probability of terminating at a given node during the random walk traversal, and a dimension factor representing probabilities of using either one of the dimensions to determine which connecting node to move to during the random walk traversal. In some embodiments, the graph analysis module 208 may determine the termination factors and the dimension factors based on inputs received from an investigator via the user interface provided by the UI module 204. In some embodiments, the graph analysis module 208 may determine the termination factors and/or the dimension factors using a machine learning model based on historical data. The graph analysis module 208 may then begin the random walk traversal of the graph based on the termination factor, the dimension factor, and the weights assigned to each edge in the graph.

The graph analysis module 208 may start at a particular seed node in the graph to perform the random walk traversal. When multiple seed nodes exist in the graph, the graph analysis module 208 may select any one of the seed nodes to start, and may repeat the random walk traversal of the graph for the other seed nodes. Upon selecting the particular seed node to start the random walk traversal of the graph, the graph analysis module 208 may determine whether to terminate the traversal of the graph based on the termination factor. As discussed herein, the termination factor may be represented as a probability, such that the graph analysis module 208 may terminate at the node (e.g., the starting node) with a x probability and may move on to a connected node with (1-x) probability, where x can be a decimal number representing a percentage. In one example, the graph analysis module 208 may obtain a random number (e.g., between 0 and 1) using a random number generator. If the random number is smaller or equal to x, the graph analysis module 208 may decide to terminate at the current node (e.g., the starting node), and end the current iteration of the random walk traversal of the graph.

On the other hand, if the random number is larger than x, the graph analysis module 208 may decide to move to a next node that is connected to the current node. Thus, the graph analysis module 208 may access the connecting nodes that are connected from the current node (e.g., the starting node) via a downstream directional edge. The graph analysis module 208 may also access the weights assigned to the edges, which may be used to determine which connecting node to traverse next. When the weights assigned to the edges are one dimensional (e.g., only one weight is assigned to each edge), the graph analysis module 208 may determine which connecting node to traverse next based on the weights. However, as discussed herein, the transaction analysis module 132 may support a random walk traversal of the graph using multi-dimensional weights. Thus, when the weights assigned to the edges are multi-dimensional (e.g., two dimensional), the graph analysis module 208 may determine which of the different dimensions to use in traversing the next node based on a dimension factor.

Similar to the termination factor, the dimension factor may be represented as a probability (e.g., a percentage), such that at any given node, the transaction analysis system may decide to use a first dimension for determining which connected node to move to next with y probability and to use a second dimension for determining which connected node to move to next with (1-y) probability, where y may be a decimal number representing as a percentage. As such, after determining not to terminate at the current node (e.g., the starting node), the graph analysis module 208 may determine which of the two dimensions to use for moving to the next hop based on the dimension factor. In one example, the graph analysis module 208 may obtain another random number (e.g., between 0 and 1) using the random number generator. If the random number is smaller or equal to y, the graph analysis module 208 may decide to use the first dimension. If the random number is larger than y, the graph analysis module 208 may decide to use the second dimension.

Based on which dimension to use for traversing the next hop in the random walk traversal, the graph analysis module 208 may access the weights assigned to the edges connecting from the current node (e.g., the starting node) and corresponding to the selected dimension. Using the weights assigned to the edges, the graph analysis module 208 may select one of the edges to move to the next node. In some embodiments, the graph analysis module 208 may determine different sub-ranges within a numeric range (e.g., between 0 and 1) for each of the edges based on the assigned weights. The larger the weight, the larger the sub-range that is determined for the edge. The graph analysis module 208 may again use the random number generator to generate a value within the numeric range, and may select an edge when the value falls within the sub-range determined for the edge. The graph analysis module 208 may follow the selected edge to access the next node connected via the edge.

When the graph analysis module 208 reaches the next node (which becomes the current node), the graph analysis module 208 may again perform a similar process to determine whether to terminate at this current node, and which connecting node to traverse next if it is determined not to terminate at the current node using the techniques disclosed herein. Thus, at each node that the graph analysis module 208 traverses during the random walk traversal of the graph, the graph analysis module 208 may use the termination factor to determine whether to terminate the current iteration of the random walk traversal. If it is determined not to terminate at the current node, the graph analysis module 208 may use the dimension factor to determine which dimension to use for determining the next node to traverse, and traverses to the next node based on the weights assigned to the connecting edges. One can appreciate that using the techniques disclosed herein, different dimensions may be used to select the next node to traverse during a single iteration of the random walk traversal of the graph. For example, the graph analysis module 208 may use weights corresponding to the first dimension for traversing from a first node in the graph to a second node in the graph, but may use weights corresponding to the second dimension for traversing from the second node in the graph to a third node in the graph.

Using the dimension factor for performing the random walk traversal enables easy re-configuration of the random walk traversal. For example, the transaction analysis system may adjust the dimension factor at the beginning of each iteration of the random walk traversal to change the importance level of each dimension. If the transaction analysis module 132 determines that the first dimension should be used more often, the dimension factor can be adjusted in favor of the first dimension. Similarly, if the transaction analysis module 132 determines that the second dimension should be used more often, the dimension factor can be adjusted in favor of the second dimension. The dimension factor may also be adjusted based on user inputs received via the user interface generated by the UI module 204.

In some embodiments, the graph analysis module 208 may use the same termination factor and dimension factor for traversing the graph throughout the iteration of the random walk traversal. In some embodiments, the graph analysis module 208 may adjust one or both of the factors during an iteration of the random walk traversal. For example, the graph analysis module 208 may use an initial termination factor (e.g., 0.2) at the beginning of the random walk traversal (e.g., at the starting node), but may increase the termination factor through the iteration of the random walk traversal (e.g., increasing by 0.05 at every hop, etc.), such that the graph analysis module 208 is more likely to terminate as the random walk traversal progresses.

After a completion of an iteration of the random walk traversal, the graph analysis module 208 may record the node at which the random walk traversal terminates. In some embodiments, the graph analysis module 208 may perform multiple iterations (e.g., 50, 100, 1,000, etc.) of the random walk traversal based on the same starting node. Each time the graph analysis module 208 performs an iteration of the random walk traversal, the graph analysis module 208 may record the node where the graph analysis module 208 terminates during the traversal. Based on the pseudo-random nature of the random walk traversal, the graph analysis module 208 may terminate at different nodes from different iterations of the random walk traversal. However, based on the termination factor and the weights assigned to the different nodes, the graph analysis module 208 may terminate at some nodes more often than other nodes.

In some embodiments, the graph analysis module 208 may rank (or assign scores to) the nodes based on the number of times that the graph analysis module 208 terminates at the nodes during the iterations of the random walk traversal. The transaction analysis system may determine a higher ranking for (or assign a higher score to) a first node than a second node when the graph analysis module 208 terminates at the first node more often than the second node during the iterations of the random walk traversal. The transaction analysis manager 202 may determine that the nodes that rank higher than a threshold (e.g., ranks 10 or above, 5 or above, etc.) are closely related to the starting node, and may determine that the accounts represented by those nodes were involved in conducting malicious activities with the seed account represented by the starting node of the random walk traversal.

When multiple seed nodes corresponding to multiple seed accounts exist in the graph, the graph analysis module 208 may perform the random walk traversal repetitively with the different seed nodes, such that different sets of accounts may be determined to be closely related to each of the different seed accounts. The random walk traversal provides insightful indications of which associated accounts are closely related to the seed account(s), which may be used by the transaction analysis manager 202 to perform further analyses and actions to the accounts (e.g., the seed account(s) and the closely related accounts). For example, after determining the accounts that are related to the seed account(s), the transaction analysis manager 202 may focus the analysis on the transactions conducted by the seed account(s) and the closely related accounts, and may ignore transactions conducted by other accounts. Focusing only on transactions conducted by the selected few accounts that are determined to be closely related to each other may enables the transaction analysis manager 202 to determine transaction patterns corresponding to malicious behavior (e.g., money laundering, other criminal activities, etc.) that may be difficult to detect when transactions associated with individual accounts are analyzed separately or when transactions associated with all connected accounts are analyzed indiscriminately. Furthermore, analyzing transactions conducted through multiple seed accounts and their closely related accounts together may enable the transaction analysis manager 202 to detect patterns based on transaction flows that cross over between different seed accounts.

In some embodiments, before performing the random walk traversal on the graph, the graph generation module 206 may pre-process the graph by eliminate one or more large transaction nodes from the graph. One or more nodes in the graph may represent a large volume merchant (e.g., a merchant account that has conducted transactions with a large number of other accounts that exceeds a threshold, such as 50, 100, 1,000, etc.). The large transaction node representing the large volume merchant may be connected with a large number of other nodes based on the transactions conducted by the merchant account. Since the large transaction node representing the large volume merchant is connected a large number of nodes, the probability that the graph analysis module 208 would reach any particular one of those nodes connected to the large transaction node is extremely slim. On the other hand, due to the connectedness of the large transaction node, the probability that the transaction analysis system would reach the large transaction node would be disproportionately large, even though the large volume merchant is likely not involved in any malicious activities. Furthermore, having the large transaction node and the connected nodes connecting to the large transaction node in the graph increases the complexity of the random walk traversal. However, while the large volume merchant likely is not involved in any malicious (or illegal) activities, the merchant may be used by malicious users in a manner that facilitates the malicious activities.

As such, in some embodiments, the graph generation module 206 may generate a rank graph that excludes the large transaction node and the nodes that are directly connected to the large transaction node in one or more downstream flows. The elimination of such nodes reduces the complexity of the random walk traversal without sacrificing the accuracy of the graph. In some embodiments, the graph generation module 206 may also generate a support graph that only excludes the nodes that are directly connected to the large transaction node in the downstream flows, but retaining the large transaction node. The graph analysis module 208 may then perform the iterations of the random walk traversal on the rank graph. In some embodiments, the graph analysis module 208 may also perform iterations of the random walk traversal on the support graph (without ranking the large transaction node(s)). After performing the random walk traversal and determining the ranking of the different nodes in the rank graph (and the support graph), the transaction analysis system may merge the rank graph with the support graph, such that the large transaction node is included in the merged graph without affecting the random walk traversal. The inclusion of the large transaction node back into the merged graph may enable the transaction analysis module 132 to analyze the transactions among the ranked nodes (including the large transaction nodes) and detect transaction patterns among those nodes.

The transaction analysis manager 202 may perform additional analyses to the accounts based on the ranking of the corresponding nodes in the graph. In some embodiments, the transaction analysis manager 202 may analyze the transactions conducted by the accounts corresponding to the nodes having a ranking higher than a threshold (e.g., 20 or higher, 10 or higher, 5 or higher, etc.). Since more than one seed account may be selected for the analysis, the nodes in the graph may be ranked for different seed accounts. The multiple seed nodes corresponding to the multiple seed accounts and the different ranked nodes based on the different seed nodes may be analyzed as a whole to detect patterns that correspond to malicious activities. This way, complex transaction flows that involve multiple layers of transactions and multiple accounts may be detected by the transaction analysis manager 202. Once a pattern that corresponds to malicious activities is detected, the transaction analysis manager 202 may perform further actions to accounts that are involved in the pattern. For example, the account security manager 210 may suspend the accounts, re-configure a security setting of the accounts to restrict certain types of transactions being conducted through those accounts, or other actions.

Figure 3:
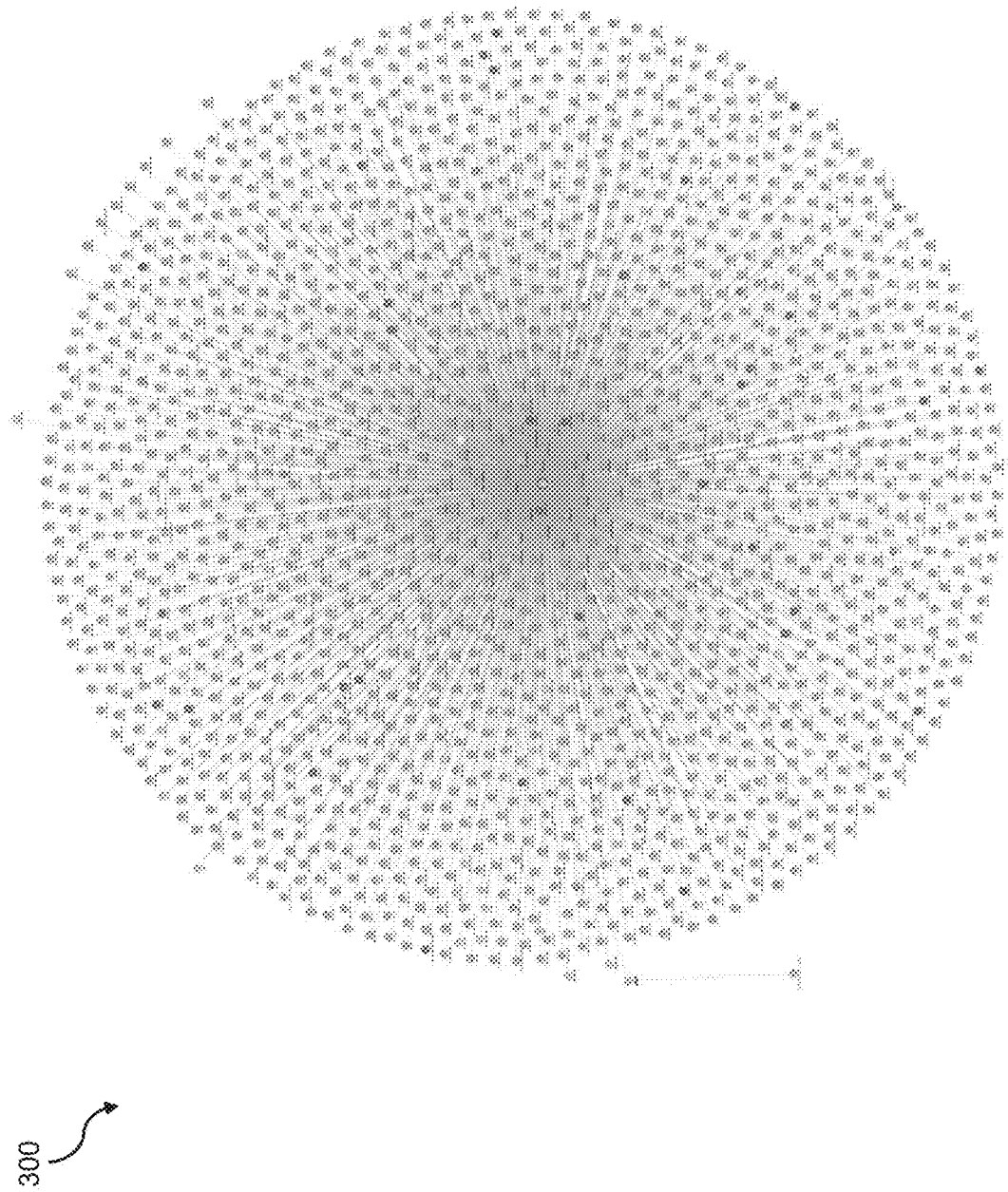
FIG. 3 illustrates a conventional networked graph for representing transactions conducted through user accounts with an online service provider according to an embodiment of the present disclosure.

FIG. 3 illustrates an example graph 300 generated by the graph generation module 206 based on one or more seed accounts according to various embodiments of the disclosure. The graph 300 includes nodes representing different user accounts with the service provider, and directional edges representing transactions conducted between user accounts. Without a focus on certain user accounts or transactions, it would be a challenge for the transaction analysis manager 202 and/or a human investigator to detect patterns corresponding to malicious activities based on the graph 300. Using the techniques illustrated herein, the transaction analysis module 132 may perform a multi-dimensional random walk traversal of the graph 300 to identify nodes that are closely related to the seed nodes.

Figure 4:
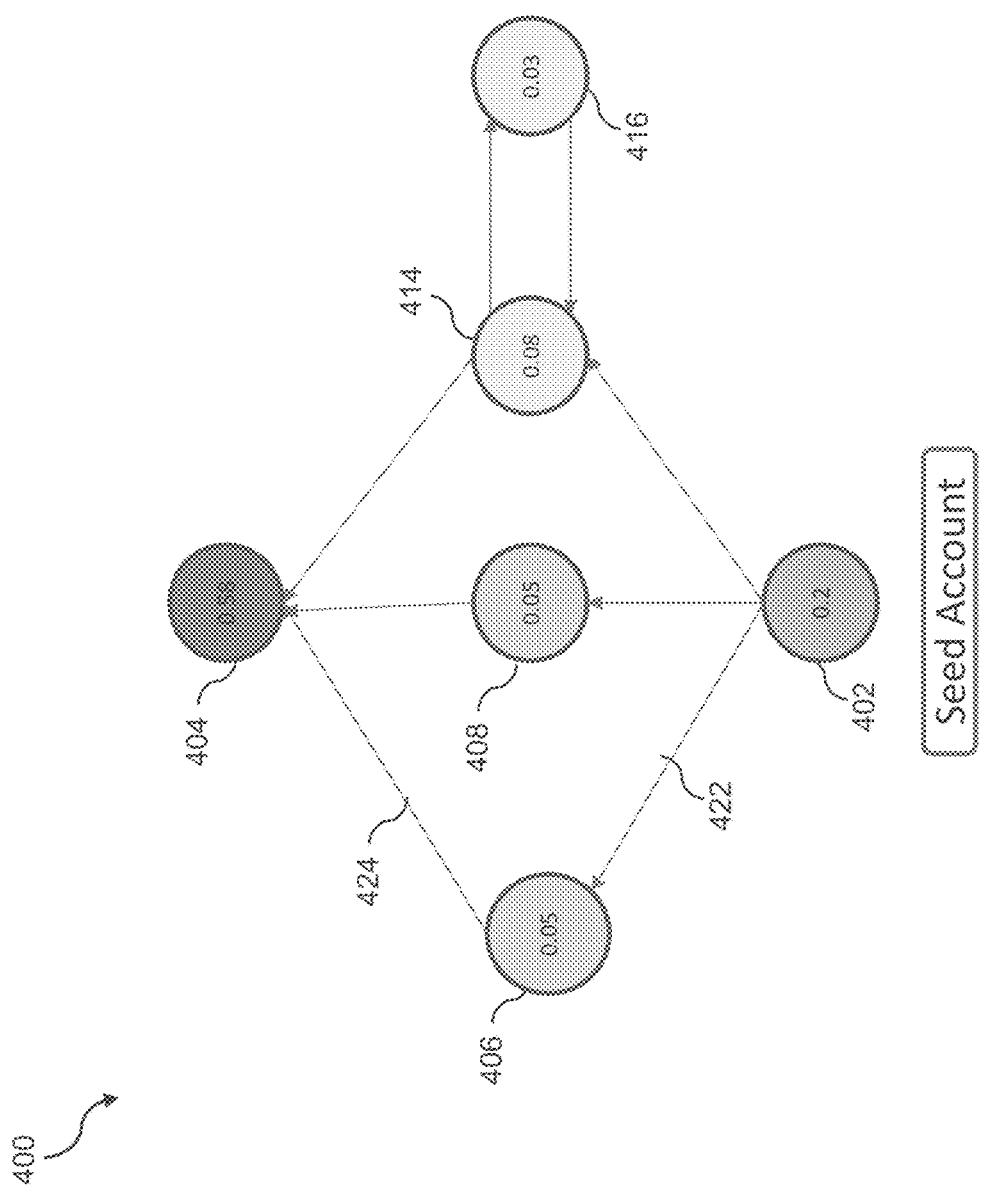
FIG. 4 illustrates an exemplary random walk traversal of a graph according to an embodiment of the present disclosure.

FIG. 4 illustrates another example graph 400 generated by the graph generation module 206 according to various embodiments of the disclosure. The graph 400 includes a seed node 402 corresponding to a seed account that the transaction analysis manager 202 determines to be likely involved in malicious activities based on analyzing of transactions associated with the seed account. The graph 400 also includes directional edges that connect from nodes to nodes and represent transactions conducted between corresponding accounts. For example, the edge 422 that connects from the node 402 to the node 406 represents one or more transactions conducted between an account represented by the node 402 and an account represented the node 406. The direction of the edge 422 indicates that a directional flow of the transaction (e.g., a flow of the funds in the transaction, etc.) from the account represented by the node 402 to the account represented by the node 406. Each of the edges may also be associated with one or more weights, representing attributes of the corresponding transactions.

By performing multiple iterations of the random walk traversal of the graph 400 starting at the seed node 402, the graph analysis module 208 may determine a probability that the traversal would terminate at each one of the nodes 402, 404, 406, 408, 414, and 416 in the graph 400 based on the number of times that the traversal terminates at the nodes in the iterations. For example, the graph analysis module 208 may determine that there is a 20% chance that the random walk traversal would terminate at the node 402, a 58% chance that the random walk traversal would terminate at the node 404, a 5% chance that the random walk traversal would terminate at the node 406, a 5% chance that the random walk traversal would terminate at the node 408, an 8% chance that the random walk traversal would terminate at the node 414, and a 3% chance that the random walk traversal would terminate at the node 416. Based on the result of the random walk traversal, the graph analysis module 208 may determine that the account represented by the node 404 is most closely related to the seed account represented by the seed node 402.

Figure 5A:
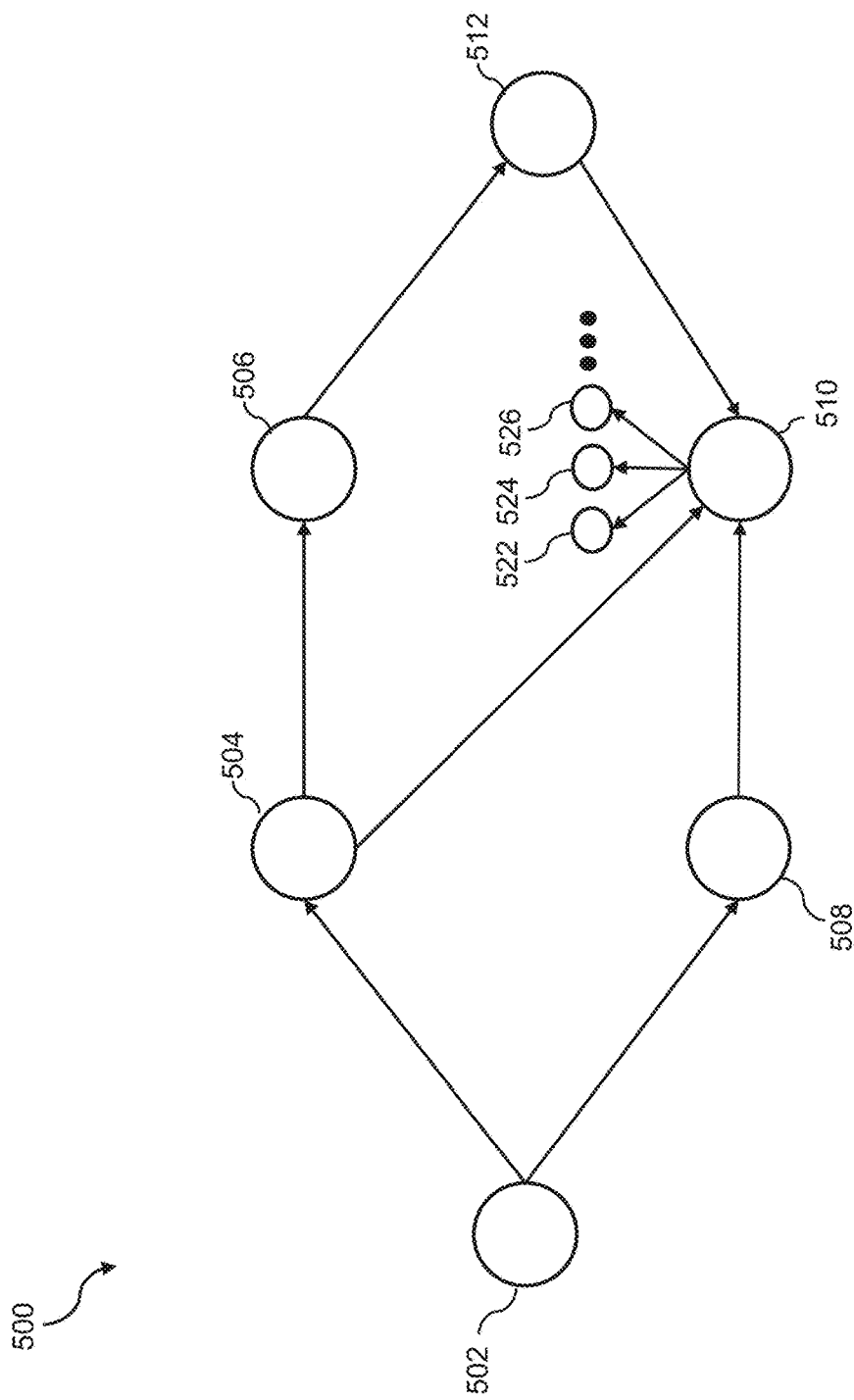
FIG. 5A illustrates an example graph generated to represent one or more transaction flows from a seed account according to an embodiment of the present disclosure.

FIG. 5A illustrates another example graph 500 generated by the graph generation module 206 that includes a large transaction node according to various embodiments of the disclosure. In some embodiments, the graph 500 is generated based on a seed account represented by a seed node 502. By following the transaction flows starting at the seed account, the graph generation module 206 includes nodes 504, 506, 508, 510, 512, 522, 524, 526, and others in the graph 500. In this example, the node 510 is a large transaction node representing a large volume account (e.g., a large merchant account), as shown by the numerous outgoing connections from the node 510 to other nodes 522, 524, 526, etc. The node 510 may be connected to a large number of other nodes (not shown). As discussed herein, in order to improve the performance of the random walk traversal, the graph generation module 206 of some embodiments may eliminate the large transaction node and its downstream connections for the traversal process.

Figure 5B:
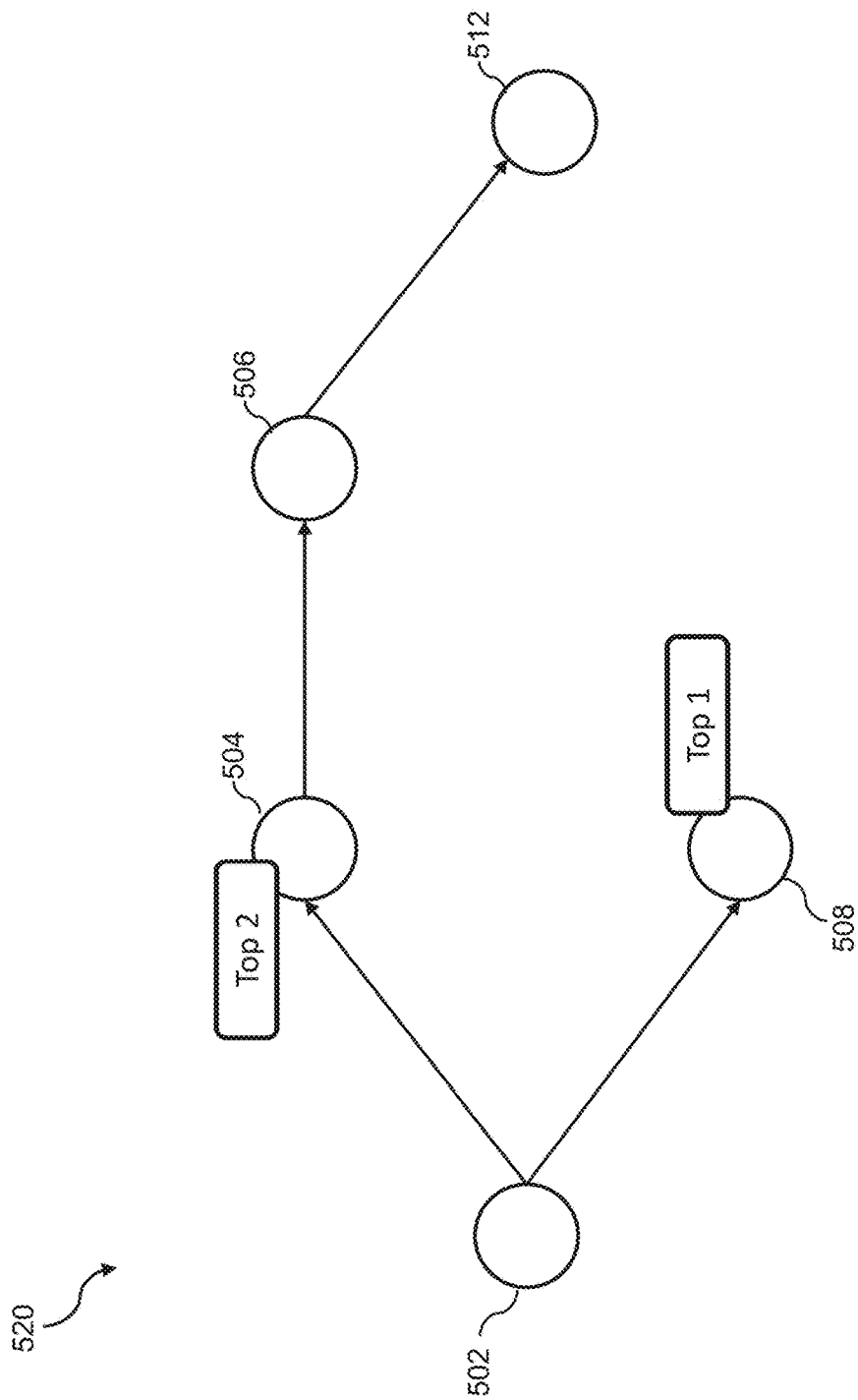
FIG. 5B illustrates an example rank graph generated to represent one or more transaction flows from a seed account with the exclusion of a large transaction node and its counterparties according to an embodiment of the present disclosure.

FIG. 5B illustrates a rank graph 520 according to various embodiments of the disclosure. In some embodiments, the rank graph 520 may be generated by the graph generation module 206 by eliminating the large transaction node 510 and its downstream connections from the graph 500. In some embodiments, the graph analysis module 208 may perform the random walk traversal on the rank graph 520 to improve the performance of the traversal. Based on the random walk traversal, the graph analysis module 208 may determine that the node 508 is most closely related to the seed node 502 in the graph 520, and the node 504 is second most closely related to the seed node 502.

Figure 5C:
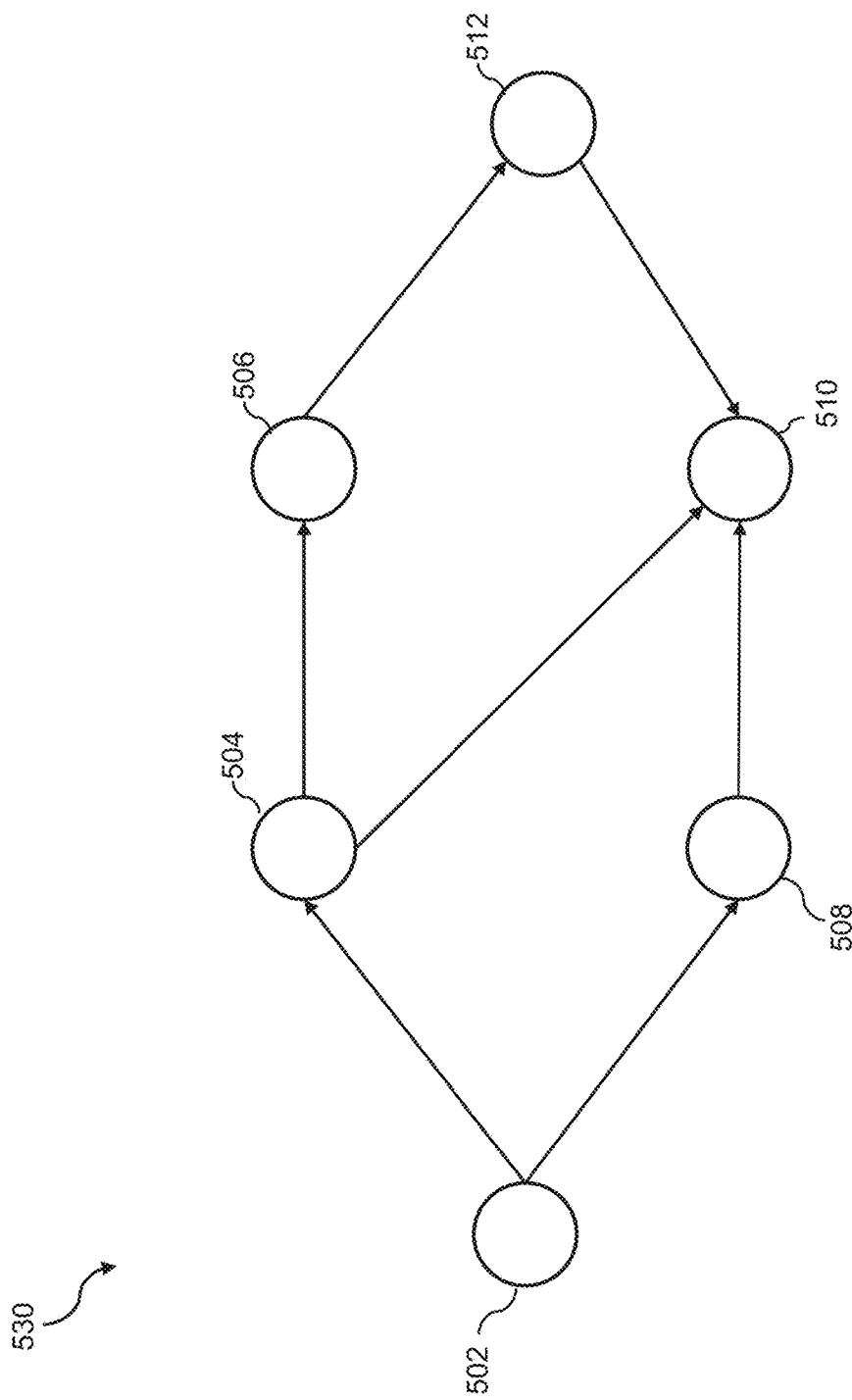
FIG. 5C illustrates an example support graph generated to represent one or more transaction flows from a seed account with the exclusion of only the counterparties of a large transaction node according to an embodiment of the present disclosure.
Figure 5D:
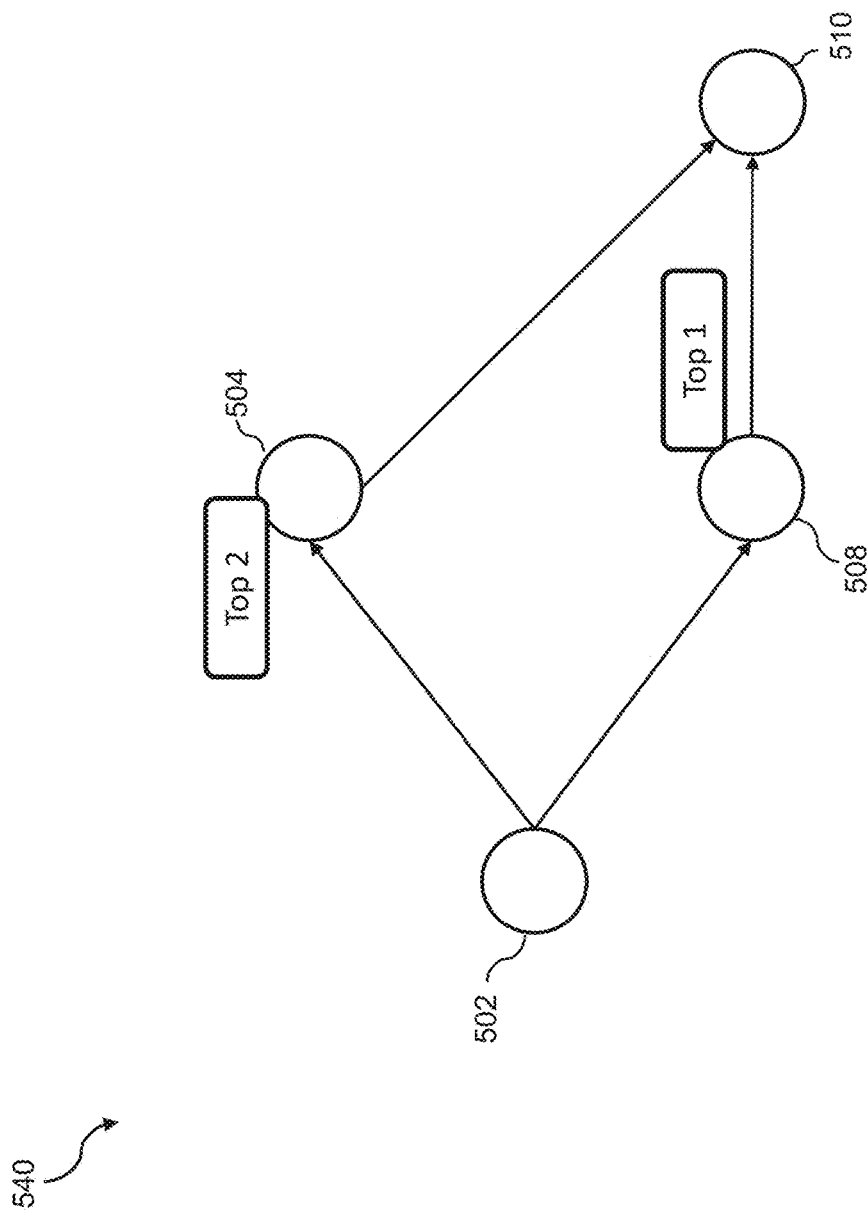
FIG. 5D illustrates an example merged graph generated by merging a rank graph and a support graph according to an embodiment of the present disclosure.

In some embodiments, in addition to the rank graph, the graph generation module 206 may generate a support graph that eliminates only the downstream connections from the large transaction node 510, but retaining the large transaction node 510. FIG. 5C illustrates such a support graph 530. After performing the random walk traversal on the graph 520, the graph analysis module 208 may merge the rank graph 520 and the support graph 530 to produce the merged graph 540, as illustrated in FIG. 5D. The merged graph 540 includes only the nodes and edges that are relevant to the analysis (e.g., nodes that represent accounts that are closely related to the seed account, which is known as the high-ranked nodes), in addition to the large transaction node 510 for the analysis. By eliminating other nodes and edges that are not as closely related to the seed account but retaining the large transaction node 510 (through which other accounts may use to conduct malicious activities), the merged graph 540 enables the transaction analysis manager 202 and/or a human investigator to analyze the transactions conducted through the accounts that may be involved in malicious activities, and more efficiently detect patterns based on those transactions.

Figure 6:
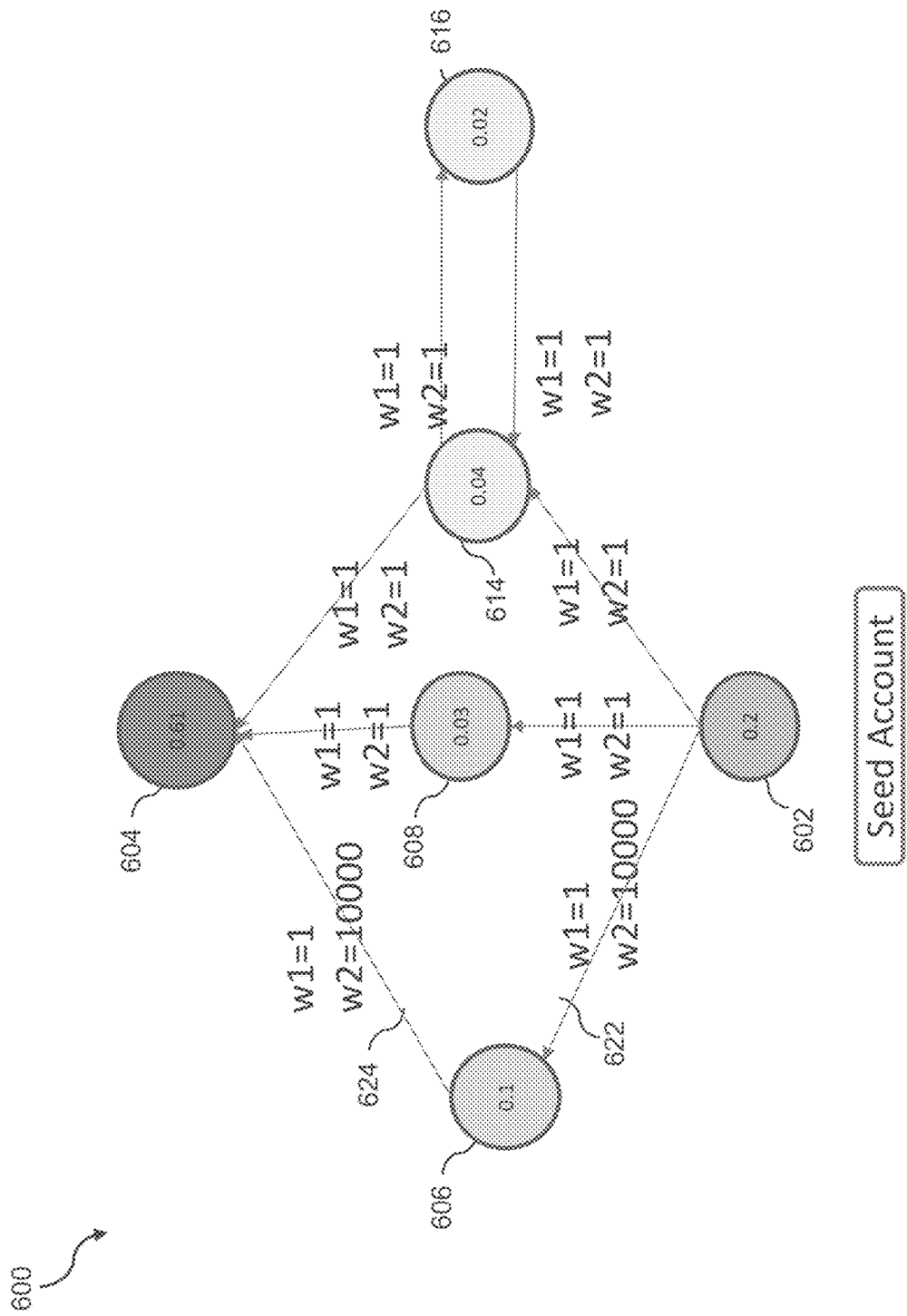
FIG. 6 illustrates an example graph having edges with multi-dimensional weights according to an embodiment of the present disclosure.

FIG. 6 illustrates an example graph 600 according to various embodiments of the disclosure. In some embodiments, the graph 600 may be generated by the graph generation module 206 based on a seed account. In this example, the graph generation module 206 may create a seed node 602 representing the seed account, and nodes 604, 606, 608, 614, and 616 representing accounts associated with downstream transactions from the seed account. The graph generation module 206 may create edges, such as edges 622 and 624, to represent the transactions among accounts represented by the nodes in the graph 600. After creating the nodes and the edges, the graph generation module 206 may assign weights to the edges. As discussed herein, in some embodiments, the transaction analysis module 132 may perform a random walk traversal of the graph based on weights in multiple dimensions. As such, the graph generation module 206 of some embodiments may assign multiple weights to each edge in the graph 600. As shown in this example, each of the edges in the graph 600 is assigned with two weights (e.g., w1 and w2) corresponding to two dimensions. In a particular example, the first dimension may correspond to the total number of transactions between the two corresponding accounts and the second dimension may correspond to the total amounts associated with the transactions conducted between the two corresponding accounts. In some embodiments, the graph analysis module 208 may perform the random walk traversal based on the weights corresponding to these two dimensions using the techniques discussed herein.

Figures 7A, 7B:
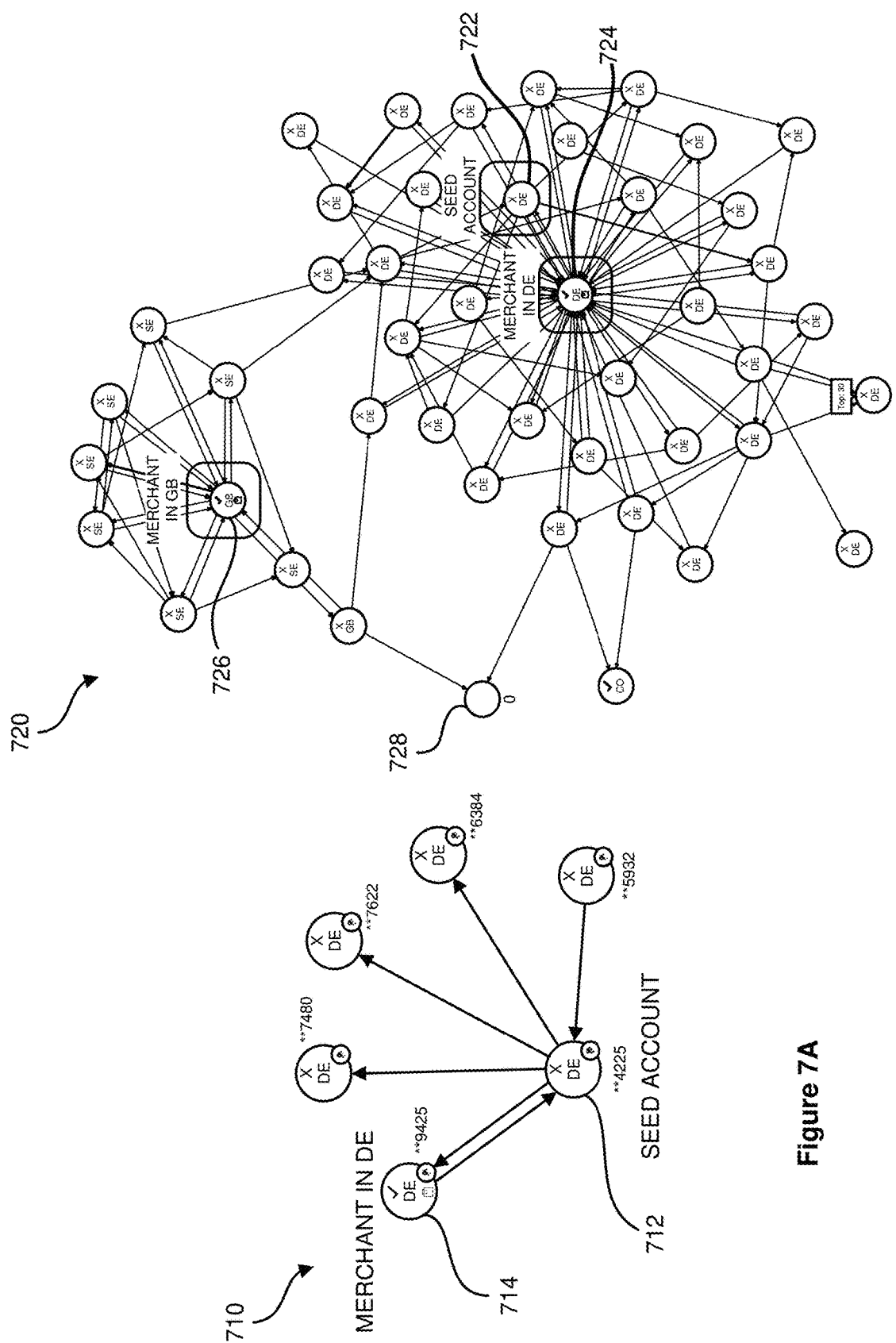
FIG. 7A illustrates a graph that shows one-hop transactions from one or more seed accounts according to an embodiment of the present disclosure.
FIG. 7B illustrates a graph that shows multiple-hop transactions from the one or more seed accounts after performing a random walk traversal analysis according to an embodiment of the present disclosure.

FIG. 7A illustrates a graph 710 that is generated based on a 1-hop transaction from a seed account according to various embodiments of the disclosure. Since a transaction graph that tracks multiple hops of transaction from a seed account, such as the graph 300 of FIG. 3, can be very complex and convoluted, an investigator may request to view a graph generated based on only a single hop of transaction from a seed account. The graph 710 includes a seed node 712 representing the seed account, and nodes representing accounts having conducted transactions directly with the seed account, which includes a large transaction account ("Merchant in Germany") represented by a large transaction node 714 and other accounts. Such a graph 710 is simpler compared to the complex graph 300 of FIG. 3, which allows the investigator to better analyze the transactions. However, the information provided by the graph 710 is limited. Given that many malicious activities involve complex transaction flows including multiple hops of transactions among multiple different user accounts, as discussed herein, the graph 710 may not help the investigator in detecting many malicious patterns being conducted by the seed account or other accounts.

FIG. 7B illustrates a graph 720 that is generated after performing the multi-dimensional random walk traversal as disclosed herein. The graph 720 includes a seed node 722 representing the same seed accounts represented by the seed node 712. The graph also includes a large transaction node 724 representing the large transaction account ("Merchant in Germany") represented by the node 714 in FIG. 7A. The graph 720 also includes nodes representing other accounts that are closely related to the seed accounts determined based on the multi-dimensional random walk traversal, edges representing transactions conducted by those accounts, and a withdrawal node 728 representing exiting of funds through accounts represented in the graph 720. As shown, the graph 720 shows multiple hops of transactions among the nodes that are determined to be closely related to the seed node 722 based on the multi-dimensional random walk traversal. In this example, based on the multi-dimensional random walk traversal, another large merchant account ("Merchant in Great Britain") is determined to be closely related to the seed account, and represented by the node 726 in the graph 720. Furthermore, the transactions shown in the graph 720 illustrate a pattern of transactions that funnel funds through the seed account, the two large merchant accounts ("Merchant in Germany and Merchant in Great Britain"), and several other accounts, before being withdrawn (as indicated by the transactions through the withdrawal node 728). Thus, the graph 720 provides substantially more information related to malicious activities conducted through the seed accounts and other closely related accounts than the graph 710 while remain relatively simple to view, as compared with the graph 300 of FIG. 3.

FIG. 8A illustrates another graph 810 that is generated based on a 1-hop transaction from a seed account according to various embodiments of the disclosure. The graph 810 includes a seed nodes 812 representing a seed account, and nodes having conducted transactions directly with the seed accounts, which includes a large transaction node 814 representing a large merchant. Such a graph 810 is simpler compared to the complex graph 300 of FIG. 3, which allows the investigator to better analyze the transactions. However, similar to the graph 710, the information provided by the graph 810 is limited. Given that many malicious activities involve complex transaction flows including multiple hops of transactions among multiple different user accounts, as discussed herein, the graph 810 may not help the investigator in detecting many malicious patterns being conducted by the seed account or other accounts.

FIG. 8B illustrates a graph 820 that is generated after performing the multi-dimensional random walk traversal as disclosed herein. The graph 820 includes a seed node 822 representing the same seed account represented by the seed node 812. The graph 820 also includes nodes representing accounts that are closely related to the seed accounts determined based on the multi-dimensional random walk traversal (which includes a large transaction node 824 representing the large merchant represented by the node 814 in FIG. 8A), edges representing transactions conducted by those accounts, and a withdrawal node 828 representing exiting of funds through accounts represented in the graph 820. As shown, the graph 820 shows multiple hops of transactions among the nodes that are determined to be closely related to the seed node 822 based on the multi-dimensional random walk traversal. In this example, based on the multi-dimensional random walk traversal, a transaction pattern emerges that shows how funds are funneled through various accounts before exiting the payment system corresponding to the service provider. Thus, the graph 820 provides substantially more information related to malicious activities conducted through the seed accounts and other closely related accounts than the graph 810 while remain relatively simple to view, as compared with the graph 300 of FIG. 3.

Referring back to FIG. 2, the multi-dimensional random walk traversal of the graph enables the transaction analysis module 132 to identify accounts that are closely related to the seed account(s) (accounts that are determined to be suspicious), and perform further analysis on transactions conducted through the identified accounts. In some embodiments, the UI module 204 may present the graph on a user interface (e.g., the user interface of the device 150) to allow an investigator to manually inspect the details of the transaction flows illustrated in the graph. However, since the graph is generated based on connecting nodes with edges to represent different transactions, when the transaction flows are complex, the graph that is generated may include many edges (including cross edges, edges that go both directions between two nodes, etc.) that make it difficult for the investigator to visualize and follow any one of the transaction flows represented in the graph.

As such, in another aspect of the disclosure, the transaction analysis module 132 may generate and present a hierarchical presentation of a graph that represents the detected transaction patterns in a clearer manner. As discussed herein, the graph (e.g., the rank graph, the support graph, and the merged graph) is usually generated to include nodes representing user accounts of the service provider and edges that connect nodes representing transactions between the user accounts, without any hierarchical structure. When the transaction flows that are represented in the graph become complicated (e.g., including cyclical transactions, bi-directional transactions between user accounts, etc.), the graph may become convoluted, such that it is difficult for the investigator to understand the transaction flows represented in the graph. In some embodiments, the graph generation module 206 may organize the nodes of the graph in a hierarchical structure having multiple layers and present the layered hierarchical structure to improve the presentation of the transaction flows.

To generate the layered hierarchical structure, the graph generation module 206 may first select a seed node in the graph. The graph generation module 206 may select a node that represents one of the seed accounts as the seed node. If there are multiple seed accounts, the graph generation module 206 may randomly select a seed account or may select a seed account having the fewest upstream transactions (e.g., a seed node having the fewest number of incoming edges). In some embodiments, the graph generation module 206 may select any node within the graph as the seed node for generating the layered hierarchical structure. The graph generation module 206 may assign the seed node to a first layer of the layered hierarchical structure. The graph generation module 206 may then assign the other nodes in the graph to different layers in the layered hierarchical structure based on a traversal of the graph from the seed node.

For example, the graph generation module 206 may perform a breadth-first search (BFS) in the graph from the seed node. As such, the graph generation module 206 may start with the selected seed node as a current node, and designate that as Level 1. The graph generation module 206 may then expand one hop outward from the current node at a time. Each time the graph generation module 206 expands outward one hop, it increments the level (e.g., from Level 1 to Level 2, etc.). The graph generation module 206 may record, for each node in the graph, the corresponding level it takes for the graph generation module 206 to reach the node. Since cyclical transactions may exist in the graph, the graph generation module 206 may reach the same node multiple times, either at the same level (e.g., the graph generation module 206 reaches the same node multiple times from different nodes during an expansion of the BFS) or at different levels (e.g., based on a cyclical series of transactions). As such, each node may be recorded with one or more levels. After completing the traversal of the graph based on the BFS, the graph generation module 206 may assign each node to a layer in the layered hierarchical structure that corresponds to the most frequently recorded search level associated with the node. For example, if a node is searched by the graph generation module 206 only at Level 3, the node is assigned to the third layer of the hierarchical structure. If a node is searched by the graph generation module 206 twice at Level 4 and only once at Level 2, the node is assigned to the fourth layer of the hierarchical structure. The assignments become the initial layer assignments for the nodes.

After the initial assignments of nodes to the different layers, the graph generation module 206 of some embodiments may iteratively reassign a node to a different layer of the layered hierarchical structure based on a goal of minimizing reverse edges in the graph. An edge is a reverse edge when the edge connects a node from a higher layer to a node to the lower layer (e.g., from Layer 3 to Layer 2), or when the edge connects a first node to a second node in the same layer without having a corresponding opposite edge that connects the second node back to the first node. However, a directional edge is not a reverse edge when the edge connects a first node to a second node in the same layer and a corresponding directional edge exists in the opposite direction (e.g., connecting the second node to the first node).

To reassign the nodes, the graph generation module 206 may iteratively select a node and determine whether to reassign the node to a different layer in the layered hierarchical structure that would yield a lower number of reverse edges in the graph. In some embodiments, the graph generation module 206 may select a node based on the number of reverse edges associated with the node. For example, the graph generation module 206 may identify a node within the graph that has the highest number of reverse edges connecting from that node to other nodes. The graph generation module 206 may then explore different positions (e.g., different layers) for that node in the layered hierarchical structure. For example, the transaction analysis system may move the node up one or more layers, move the node down one or more layers, move the node in between two layers (e.g., creating a new layer for the node in between two existing layers in the layered hierarchical structure), and may determine a position for the node that provides the minimum number of reverse nodes in the graph.

The graph generation module 206 may iteratively identify and reassign nodes until a condition is detected. In some embodiments, the condition may be the determination that moving an identified node in any other position would no longer reduce the overall number of reverse edges in the graph. In some embodiments, the graph generation module 206 may transform the presentation of the graph based on the layered hierarchical structure. For example, the graph generation module 206 may re-arrange the positions of the nodes in the graph according to their assigned layers to improve the visibility of the transaction flows (how series of transactions are conducted) within the graph. By minimizing reverse edges, most of the edges (which represent the flow of funds) are directing in the same direction from a lower layer to a higher layer in the layered hierarchical structure, which makes it easier for an investigator to follow the transaction flows (e.g., how the funds are moved among the accounts).

In some embodiments, to further analyze the transaction flows presented in the graph, the transaction analysis manager 202 may label the nodes based on the layers assigned to the nodes. For example, the transaction analysis manager 202 may determine three different labels for the nodes: a source node, an intermediate node, and a withdrawal node. The node(s) that are assigned to the lowest layer (e.g., the first layer) of the layered hierarchical structure may be labeled as the source node(s) as the corresponding account(s) provide the funds in the transaction flow(s), the node(s) that are assigned to the highest layer of the layered hierarchical structure may be labeled as the withdrawal node(s) as the corresponding account(s) withdraw the funds in the transaction flow(s), and the node(s) that are assigned to any other layers of the layered hierarchical structure may be labeled as the intermediate node(s). The transaction analysis manager 202 may then analyze the corresponding accounts, for example, using the techniques disclosed herein to detect any transaction patterns that corresponds to malicious activities, but with the aid of the labeling of the nodes. As such, the re-organization of the graph based on a layered hierarchical structure provides an improved visual tool for an investigator to manually inspect the transaction flows, and also allows the transaction analysis system to improve on analyzing and detecting malicious activities conducted through user accounts of the service provider. In some embodiments, the UI module 204 may also present the nodes (and/or the edges) in the graph differently based on their assigned layers. For example, the UI module 204 may present the source node(s) in a first manner (e.g., in a first color, in a first size, etc.), may present the intermediate node(s) in a second manner (e.g., in a second color, in a second size, etc.), and may present the withdrawal node(s) in a third manner (e.g., in a third color, in a third size, etc.).

Figure 9A:
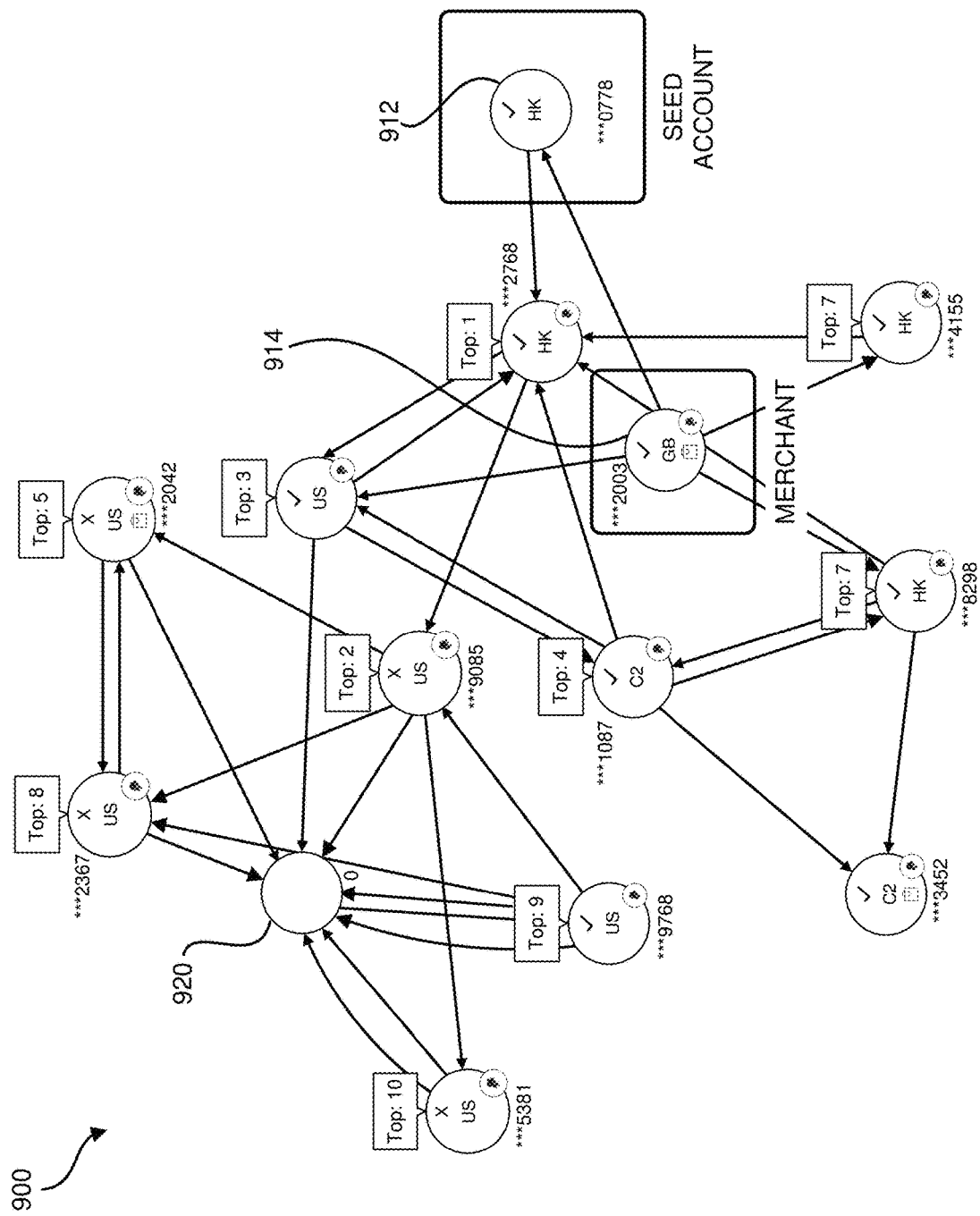
FIG. 9A illustrates a graph generated based on one or more seed accounts according to an embodiment of the present disclosure.

FIG. 9A illustrates a graph 900 generated by the graph generation module 206 after performing a random walk traversal based on a seed account. As shown, the graph 900 includes a seed node 912 representing the seed account. The graph 900 also includes nodes representing accounts that are closely related to the seed accounts determined based on the multi-dimensional random walk traversal (which includes a large transaction node 914 representing a large transaction merchant), edges representing transactions conducted by those accounts, and a withdrawal node 920 representing exiting of funds through accounts represented in the graph 900. As shown, the graph 900 shows multiple hops of transactions among the nodes that are determined to be closely related to the seed node 912 based on the multi-dimensional random walk traversal. The graph 900 is presented without any hierarchical structure. Thus, the graph 900, when presented on a user interface via the UI module 204, may place the nodes in random positions, such as what is shown in FIG. 9A. Since directional edges may connect nodes from different positions, the presentation of the graph 900 may include cross edges (e.g., edges that cross over each other), multiple edges that are concentrated in an area, and other visual distractions that makes it difficult to follow the transactions flows and to determine the nodes that were used to withdraw funds in the graph 900.

Figure 9B:
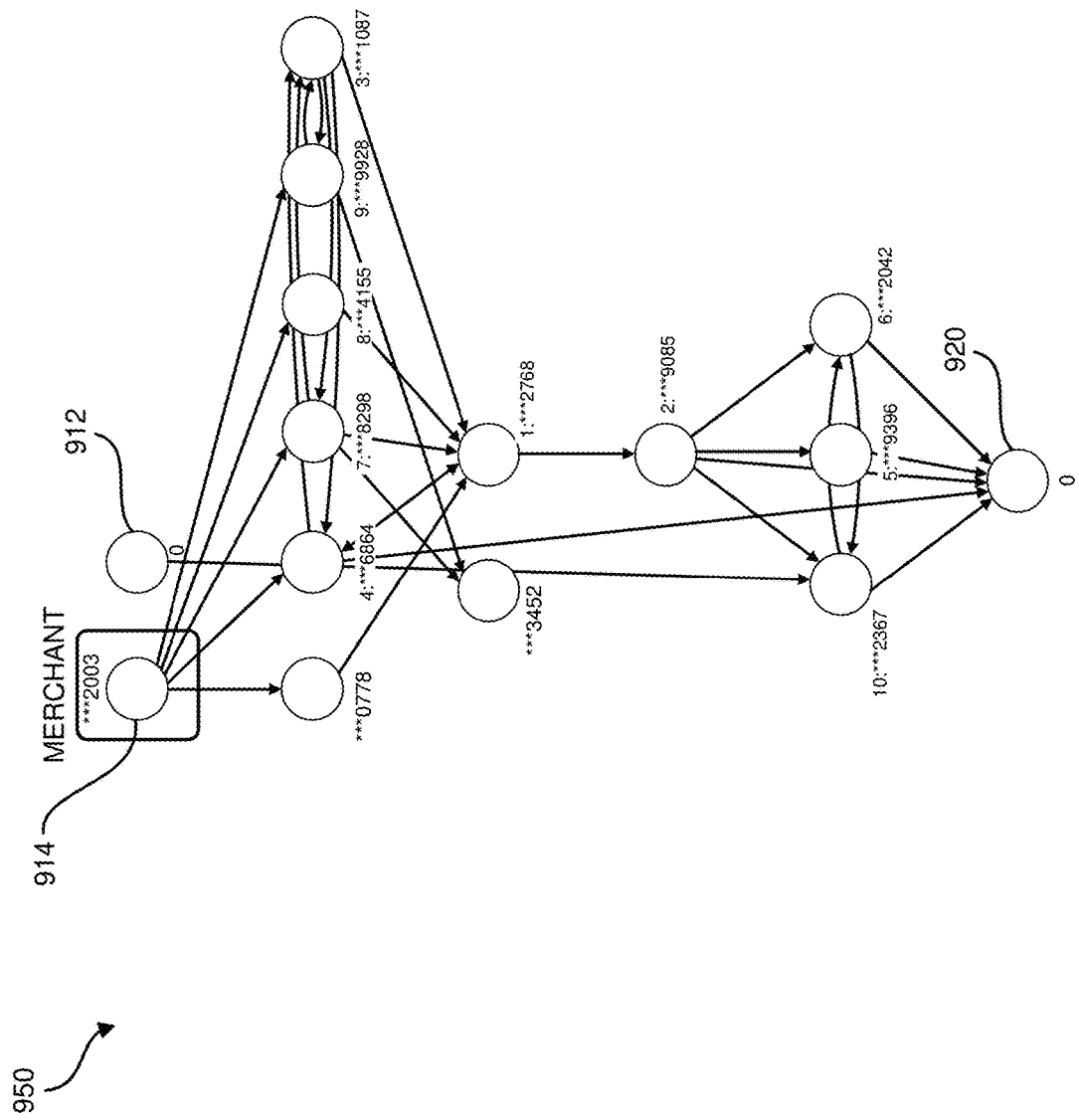
FIG. 9B illustrates a graph that has been transformed based on assigning nodes to different layers in a layered hierarchical structure according to an embodiment of the present disclosure.

Thus, in some embodiments, the graph generation module 206 may re-organize the graph 900 using a layered hierarchical structure. Specifically, the graph generation module 206 may assign (and reassign) each node to a layer within the layered hierarchical structure using the techniques disclosed herein. FIG. 9B illustrates a graph 950 that has been transformed based on the graph 900 using the layered hierarchical structure according to various embodiments of the disclosure. As shown, the graph 950 includes the seed node 912 and the large transaction node 914 in the first layer of the layered hierarchical structure. The graph also includes the withdrawal node 920 in the highest (the sixth) layer of the layered hierarchical structure, since only incoming edges (and no outgoing edges) are connected to the withdrawal node 920. The graph also includes edges that are mostly connecting nodes from a lower layer to a higher layer, making it easier for an investigator viewing the graph to investigate and analyze different transaction flows that, according to the graph 950, funnel funds from nodes in the lower layer to nodes in the higher layer before exiting via the withdrawal node 920. In some embodiments, the graph generation module 206 may transform the graph 900 to the graph 950 by re-arranging the positions of the nodes based on the layers within the layered hierarchical structure assigned to the nodes, and may present the graph 950 on a device (e.g., the device 150) via the UI module 202.

Figure 10A:
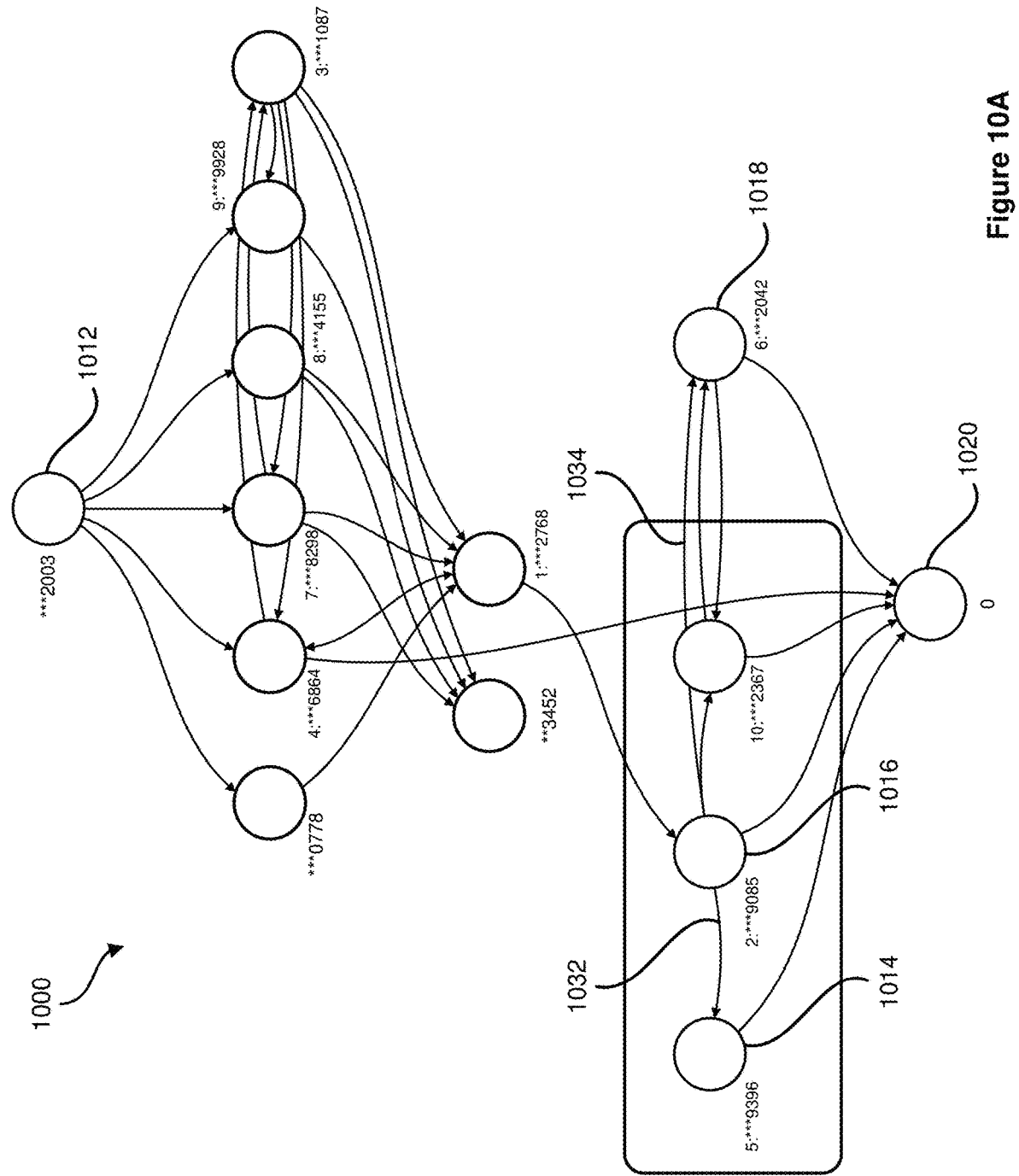
FIG. 10A illustrates a graph with nodes connected via reverse nodes according to an embodiment of the present disclosure.

FIG. 10A illustrates another graph 1000 that is generated by the graph generation module 206 according to various embodiments of the disclosure. In this example, the graph generation module 206 has assigned the nodes in the graph 1000 to different layers in a layered hierarchical structure. Thus, most of the directional edges in the graph 1000 connect nodes from a lower layer to a higher layer. However, as shown in FIG. 10A, numerous reverse edges, such as reverse edges 1032 and 1034 exist, in the graph 1000. The edge 1032 is a reverse edge because it connects a node 1016 to another node 1014 within the same layer (the fourth layer) in the layered hierarchical structure without a corresponding opposite edge that directs from the node 1014 back to the node 1016. Similarly, the edge 1034 is also a reverse edge because it connects the node 1016 to another node 1018 within the same layer (the fourth layer) in the layered hierarchical structure without a corresponding opposite edge that directs from the node 1018 back to the node 1016. The reverse edges can cause confusion to an investigator viewing the graph 1000.

Figure 10B:
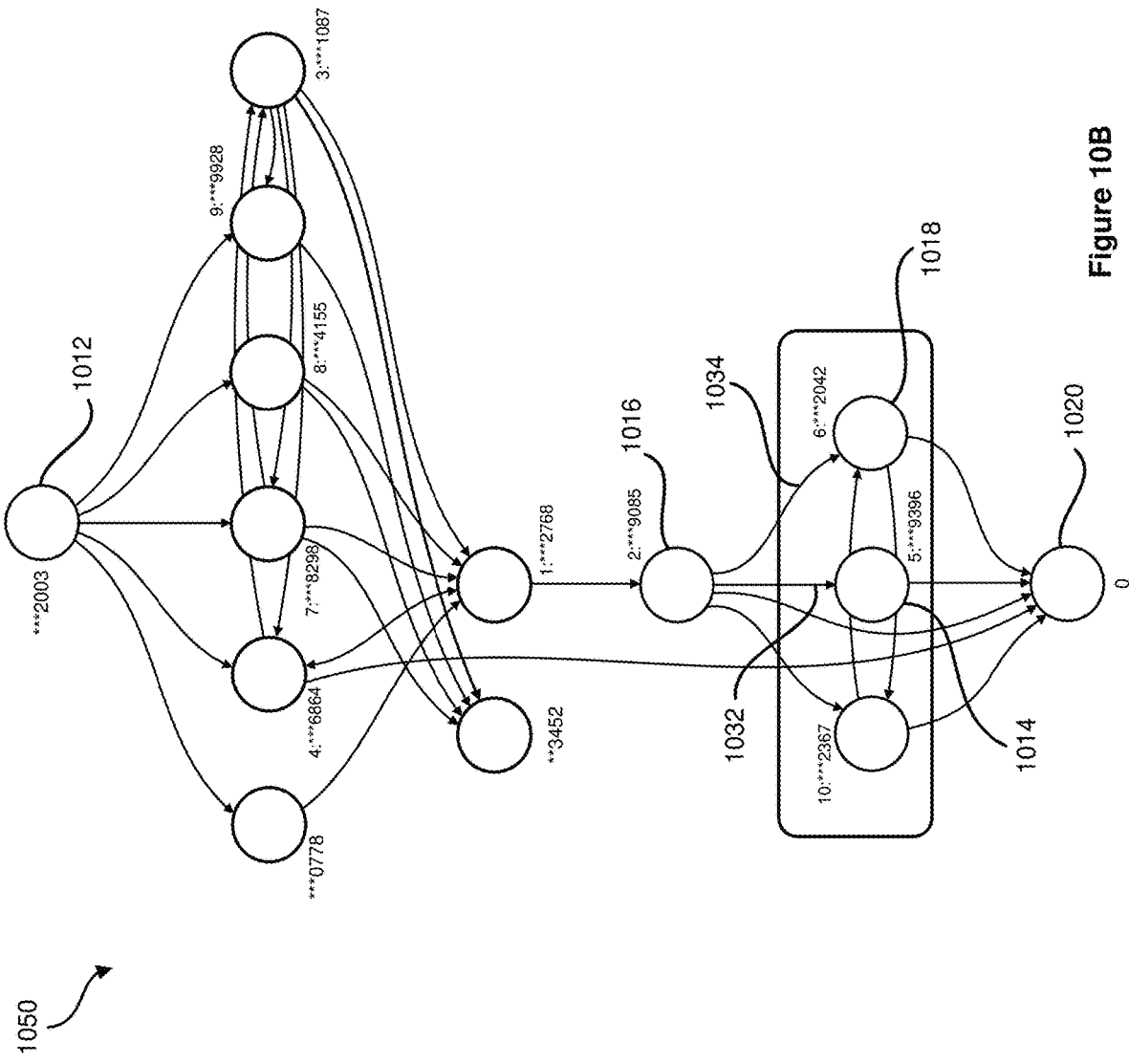
FIG. 10B illustrates a graph with a node being reassigned to another layer within a layered hierarchical structure to reduce the number of reverse edges according to an embodiment of the present disclosure.

In some embodiments, the graph generation module 206 may reassign nodes to different positions within the layered hierarchical structure in order to minimize the number of reverse edges in the graph 1000. In this example, the graph generation module 206 may determine that the node 1016 is connected to several outbound reverse edges. Thus, the graph generation module 206 may move the node 1016 to another position to minimize the number of reverse edges in the graph 10000. FIG. 10B illustrates a graph 1050 after reassigning the node 1016 to another position in the graph 1000 according to various embodiments of the disclosure. As shown in FIG. 10B, the graph generation module 206 has moved the node 1016 to a position between the third layer and the fourth layer in the original graph 1000. In other words, the graph generation module 206 has added a new layer between the third layer and the fourth layer in the original graph 1000, and move the node 1016 to the new layer. After reassigning the node 1016 to the new layer, the edges 1032 and 1034 are no longer reverse edges in the graph 1050. The graph 1050 provides an improved visualization of the transaction flows compared to the graph 1000.

Figure 11A:
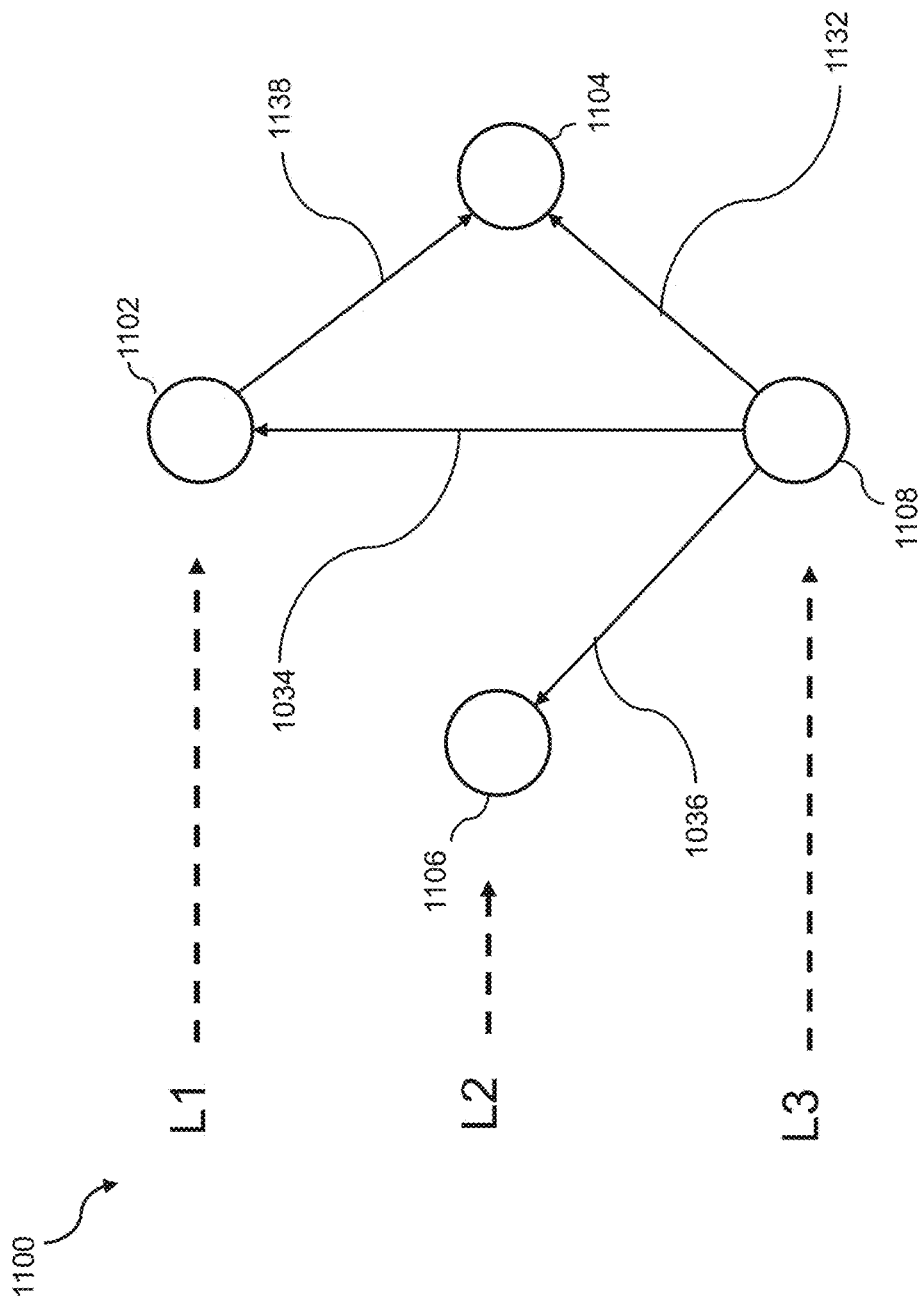
FIG. 11A illustrates another graph with nodes connected via reverse nodes according to an embodiment of the present disclosure.
Figure 11B:
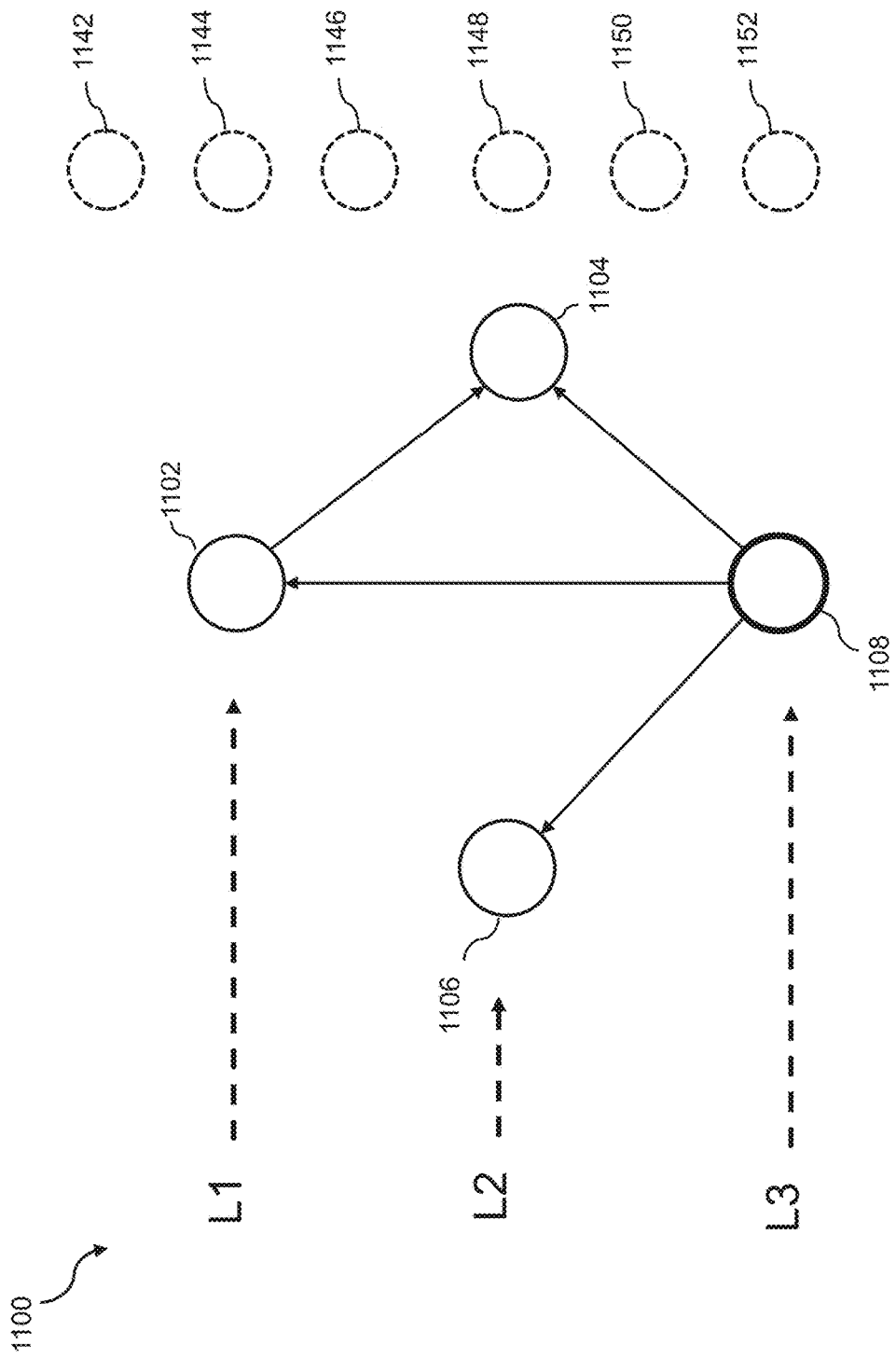
FIG. 11B illustrates various positions for reassigning a node in a graph according to an embodiment of the present disclosure.
Figure 11C:
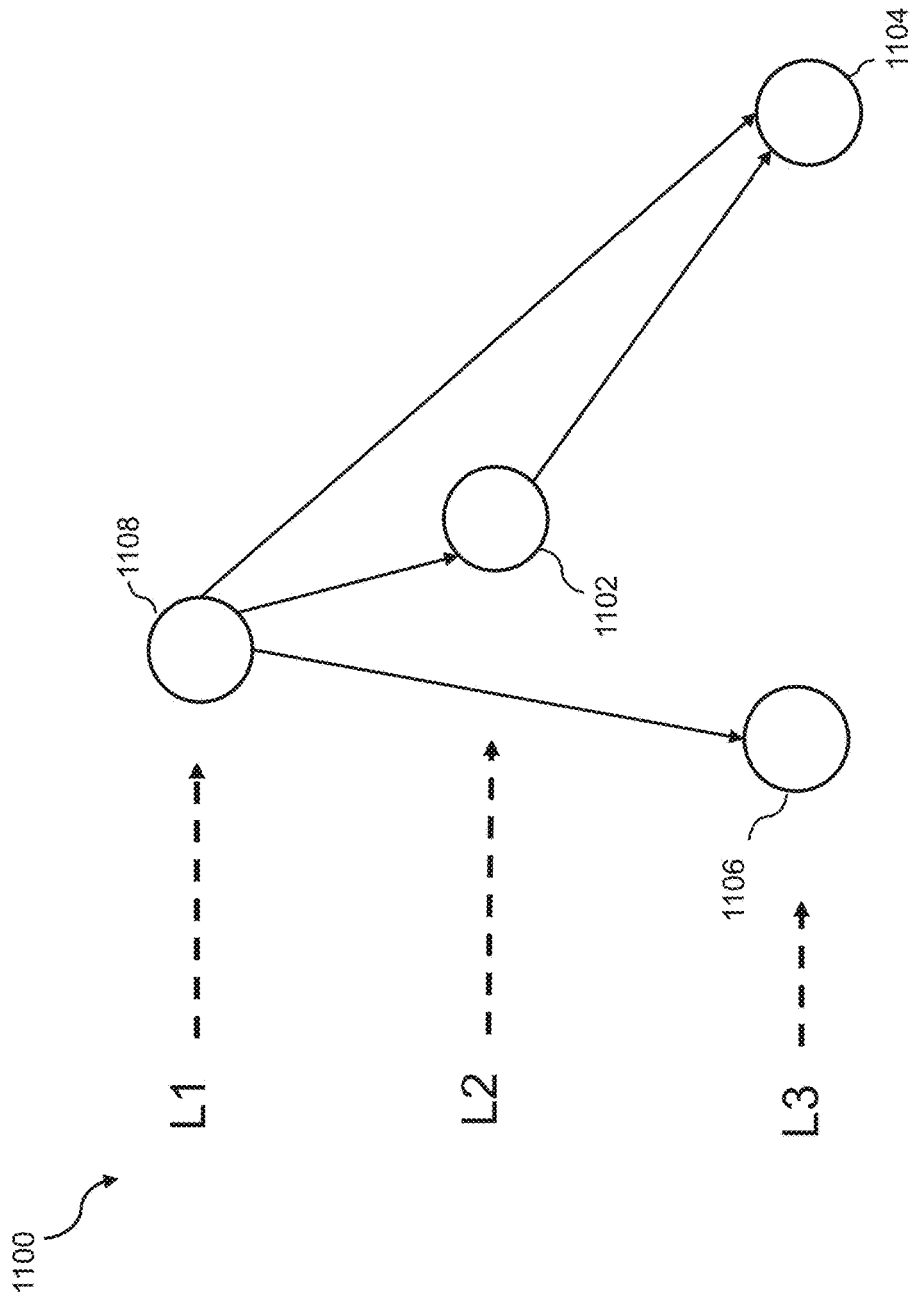
FIG. 11C illustrates reassigning a node in a graph for reducing the number of reverse edges according to an embodiment of the present disclosure.

FIGS. 11A-11C illustrate the techniques of reassigning nodes to different layers according to some embodiments of the disclosure. Specifically, FIG. 11A illustrates a graph 1100 that comprises four nodes 1102, 1104, 1106, and 1108. In some embodiments, the graph 1100 may be a portion of a larger graph generated by the graph generation module 206, but is used for illustrative purposes. The graph 1100 includes three layers—Layer 1, Layer 2, and Layer 3. In this example the node 1102 has been assigned to Layer 1, the nodes 1104 and 1106 have been assigned to Layer 2, and the node 1108 has been assigned to Layer 3. The assignments of the nodes 1102, 1104, 1106, and 1108, to the respective layers as shown in FIG. 11A may be determined based on initial assignments by the graph generation module 206 after performing a BFS on a graph.

The graph 1100 also includes four edges 1132, 1134, 1136, and 1138 connecting the nodes 1102, 1104, 1106, and 1108. Out of the four edges, three edges 1132, 1134, and 1136 are reverse edges. Thus, the graph generation module 206 may determine whether reassigning one or more nodes to a different layer would reduce the number of reverse edges in the graph 1100. In some embodiments, the graph generation module 206 may identify, from the graph 1100, a node that has the most number of outbound reverse edges connected as a candidate for reassignment. In this example, the graph generation module 206 may identify the node 1108 as having three reverse edges connected from the node 1108 to other nodes in a lower layer. The graph generation module 206 may then determine different position candidates to which the node 1108 may be reassigned.

FIG. 11B illustrates the different position candidates determined by the graph generation module 206 to which the node 1108 may be reassigned according to various embodiments of the disclosure. As shown in 11B, the graph generation module 206 may determine five different positions for reassigning the node 1108, including position 1142 (e.g., Level 0.5, which comes before Level 1), position 1144 (e.g., at Level 1 alongside with the node 1102), position 1146 (e.g., Level 1.5 between Level 1 and Level 2, which comes between the node 1102 at Level 1 and the nodes 1106 and 1104 at Level 2), position 1148 (e.g., at Level 2 alongside with the nodes 1104 and 1106), position 1150 (e.g., Level 2.5 between Level 2 and Level 4, which comes between the nodes 1104 and 1106 at Level 2, and any node (if exists) in Level 3), and position 1152 (e.g., remaining at Level 3). The graph generation module 206 may explore these different positions 1142, 1144, 1146, 1148, 1150, and 1152, and may determine which position for the node 1108 would yield the lowest number of reverse edges for the graph 1100.

For example, the graph generation module 206 may determine that leaving the node 1108 at the position 1152 would yield three reverse edges in the graph 110. The graph generation module 206 may also determine that moving the node 1108 to the position 1150 or the position 1148 would not change the number of reverse edges. The graph generation module 206 may also determine that moving the node 1108 to the position 1146 or the position 1144 would reduce the number of reverse edges to one. The graph generation module 206 may also determine that moving the node 1108 to the position 1142 would reduce the number of reverse edges to 0. Based on this analysis, the graph generation module 206 may determine to move the node 1108 to the position 1142 by creating a new level before Level 1, and reassigning the node 1108 to the new level.

FIG. 11C illustrates the graph 1100 after reassigning the node 1108 to the new level before Level 1. The graph generation module 206 may also re-label the level numbers based on the newly created level. As such, the node 1108 is now assigned to Level 1, the node 1102 is assigned to Level 2, and the nodes 1104 and 1106 are assigned to Level 3.

Figure 12:
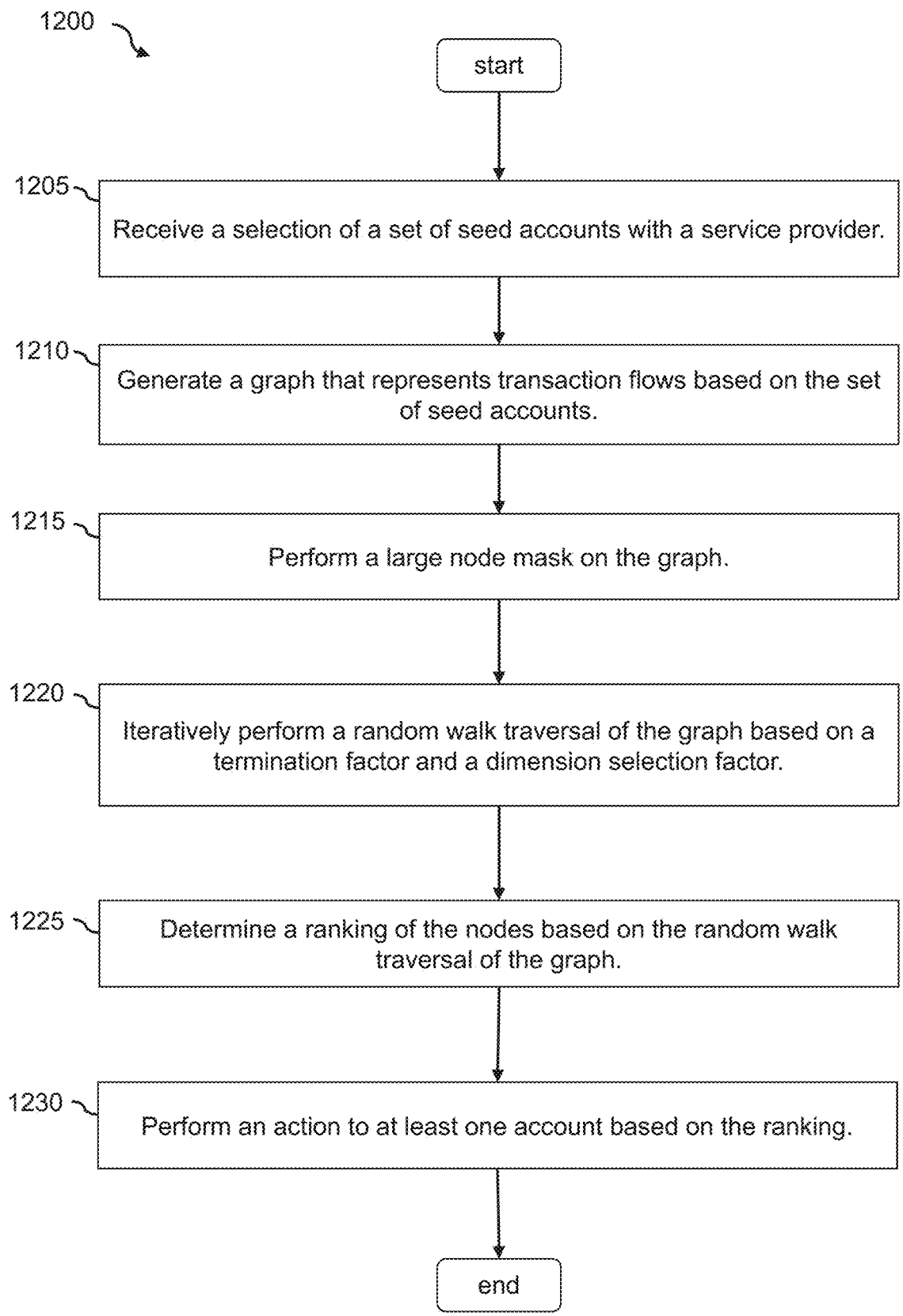
FIG. 12 is a flowchart showing a process of performing a random walk traversal of a graph according to an embodiment of the present disclosure.

FIG. 12 illustrates a process 1200 for analyzing transactions based on a multi-dimensional random walk traversal of a graph according to various embodiments of the disclosure. In some embodiments, at least a portion of the process 1200 may be performed by the transaction analysis module 132. The process 1200 may begin by receiving (at step 1205) a selection of a set of seed accounts with a service provider. For example, the transaction analysis manager 202 may identify one or more seed accounts with the service provider that are determined to be involved with suspicious activities. In some embodiments, the transaction analysis manager 202 may receive the selection from an investigator via a user interface provided by the UI module 204. In some embodiments, the transaction analysis manager 202 may analyze the user accounts with the service provider in an account-by-account basis, and may determine one or more user accounts that are likely involved in suspicious activities based on attributes, such as transactions previously conducted by the user accounts.

The process 1200 then generates (at step 1210) a graph that represents transaction flows based on the set of seed accounts. For example, the graph generation module 206 may generate a graph based on the set of seed accounts. The graph generation module 206 may first create a set of seed nodes representing the set of seed accounts. The graph generation module 206 may then follow transactions (e.g., downstream transactions) conducted by the set of seed accounts, and identify counterparty accounts associated with those transactions. The graph generation module 206 may create nodes to represent the counterparty accounts and edges that connect the seed nodes to the other nodes to represent the transactions between the seed accounts and the counterparty accounts. The graph generation module 206 may continue to trace transactions originated from the counterparty accounts in a downstream manner until a predetermined number of hops of transactions (e.g., 5 hops, 10 hops, etc.) is reached. As such, the graph generation module 206 may continue to create new nodes for the new counterparty accounts and new edges to represent the downstream transactions until the predetermined number of hops of transactions is reached.

After generating the graph, the process 1200 performs (at step 1215) a large node mask on the graph. As discussed herein, large transaction nodes that represent large merchant accounts that are associated with a large number of counterparty accounts may not be useful in the analyzing of the transaction flows. Thus, in some embodiments, the graph generation module 206 may determine one or more large transaction nodes (e.g., nodes that represent accounts that perform transactions with a number of counterparty accounts exceeding a threshold, such as 100, 1000, etc.). The graph generation module 206 may generate a rank graph by eliminating the large transaction nodes and the counterparty nodes that are connected with only the large transaction nodes in the graph. Thus, if a counterparty node is connected with a large transaction node and also another node in the graph, that counterparty node may not be eliminated. In some embodiments, the graph generation module 206 may also generate a support graph by eliminating only the counterparty nodes that are connected with the large transaction nodes, but not the large transaction nodes themselves.

In some embodiments, the graph generation module 206 may assign weights to each edge in the rank graph. The weights assigned to each edge may correspond to two or more dimensions related to the transactions. For example, the graph generation module 206 may determine a first dimension corresponding to a total number of transactions conducted between two accounts and a second dimension corresponding to a total amount associated with the transactions conducted between two accounts. Thus, for each edge in the rank graph, the graph generation module 206 may assign a first weight representing a total number of transactions conducted between the accounts represented by the corresponding nodes being connected by the edge and a second weight representing a total amount associated with the transactions conducted between the accounts represented by the corresponding nodes being connected by the edge.

The process 1200 then iteratively performs (at step 1220) a random walk traversal of the graph based on a termination factor and a dimension selection factor and determines (at step 1225) a ranking of the nodes based on the random walk traversal of the graph. The graph analysis module 208 may analyze the rank graph by performing a random walk traversal on the rank graph. The graph analysis module 208 may begin the random walk traversal at a seed node in the rank graph. At each node accessed by the graph analysis module 208, the graph analysis module 208 may first determine whether to terminate the traversal at that node based on the termination factor. If it is determined that the traversal is to be terminated, the graph analysis module 208 ends the current iteration of the traversal. On the other hand, if it is determined that the traversal is not to be terminated, the graph analysis module 208 may determine which dimension to use for selecting the next connecting node to traverse based on the dimension factor. If it is determined that the first dimension is used, the graph analysis module 208 may use the first weights assigned to the edges to determine which connecting node to traverse next in the random walk traversal. If it is determined that the second dimension is used, the graph analysis module 208 may use the second weights assigned to the edges to determine which connecting node to traverse next in the random walk traversal.

As such, after each iteration of the random walk traversal, the graph analysis module 208 may arrive at a node where the traversal ends. The graph analysis module 208 may perform multiple iterations of the random walk traversal. Based on the different nodes where the traversal ends, the graph analysis module 208 may determine a probability for each node in the rank graph, the probability indicating a likelihood that a random walk traversal ends at that node. The graph analysis module 208 may then rank the nodes based on the probabilities. The ranking may indicate how closely the node is related to the seed node where the random walk traversal started. If multiple seed nodes exist in the rank graph, the graph analysis module 208 may perform the iterations of random walk traversal for each of the seed nodes, and determine ranking of the nodes for each of the seed nodes. After ranking the nodes in the rank graph, the graph generation module 206 may merge the rank graph with the support graph to include the large transaction node(s) in the merged graph. Including the large transaction node(s) in the merged graph enables more efficient and accurate analysis of the transaction flows.

The process 1200 then performs (at step 1230) an action to at least one account based on the ranking. For example, based on analyzing the transactions conducted by the seed accounts and other accounts represented by nodes that are determined to be closely related to the seed nodes based on the ranking, the transaction analysis manager 202 may determine one or more accounts that are involved in malicious activities. The account security module 210 may then perform one or more actions to the one or more accounts, which may include suspending the accounts, imposing one or more restrictions on the accounts, denying new transaction requests initiated from those accounts, etc.

Figure 13:
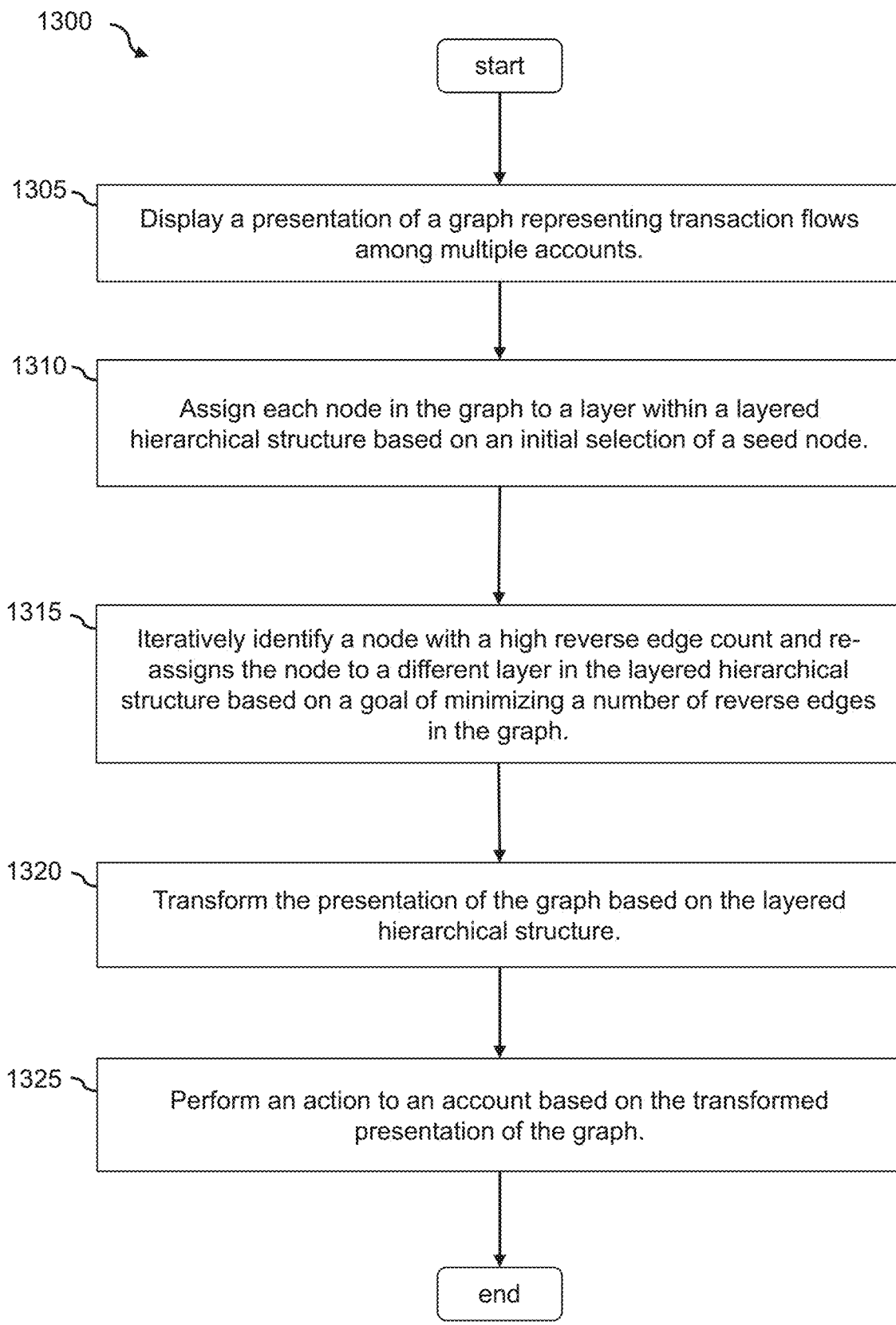
FIG. 13 is a flowchart showing a process of transforming a graph using a layered hierarchical structure according to an embodiment of the present disclosure.

FIG. 13 illustrates a process 1300 for transforming a presentation of a graph based on a layered hierarchical structure according to various embodiments of the disclosure. In some embodiments, at least a portion of the process 1300 may be performed by the transaction analysis module 132. The process 1300 may begin by displaying (at step 1305) a presentation of a graph representing transaction flows among multiple accounts. For example, the UI module 204 may present, on a user interface of a device (e.g., the device 150), the merged graph, which may enable an investigator to view and analyze the transaction flows based on the merged graph.

The process 1300 then assigns each node in the graph to a layer within a layered hierarchical structure based on an initial selection of a seed node. As discussed herein, the merged graph may not have an organization of nodes that provides a clear illustration of the transaction flows represented in the graph. Thus, in some embodiments, the graph generation module 206 may re-organize the nodes in the merged graph according to a layered hierarchical structure having multiple layers. The graph generation module 206 may initially assign each node to a layer within the layered hierarchical structure. In this regard, the graph generation module 206 may select a seed node from the merged graph, and assign the seed node to a first layer of the layered hierarchical structure. The graph generation module 206 may then traverse other nodes in the graph based on a breadth-first search, and may assign the nodes to different layers of the layered hierarchical structure.

The process 1300 then, at step 1315, iteratively identifies a node with a high reverse edge count and reassigns the node to a different layer in the layered hierarchical structure based on a goal of minimizing a number of reverse edges in the graph. For example, the graph generation module 206 may identify a node in the graph that is connected to the most number of outbound reverse edges. The graph generation module 206 may explore different positions within the layered hierarchical structure for the node and determine whether reassigning the node to another position within the layered hierarchical structure would yield a lower overall number of reverse edges in the graph. The graph generation module 206 may reassign the node to a position that would result in the minimum number of reverse edges in the graph.

The process 1300 transforms the presentation of the graph based on the layered hierarchical structure. For example, the graph generation module 206 may transform the merged graph by re-positioning the nodes according to the layers within the layered hierarchical structure assigned to the nodes. The transaction analysis manager 202 may then display, via the UI module 204, the transformed presentation of the merged graph on a user interface of a device. The process 1300 then performs an action to an account based on the transformed presentation of the graph. For example, the transaction analysis manager 202 may analyze the transactions associated with the accounts based on the transformed presentation of the graph, and may perform one or more actions to the accounts based on the analysis.

Figure 14:
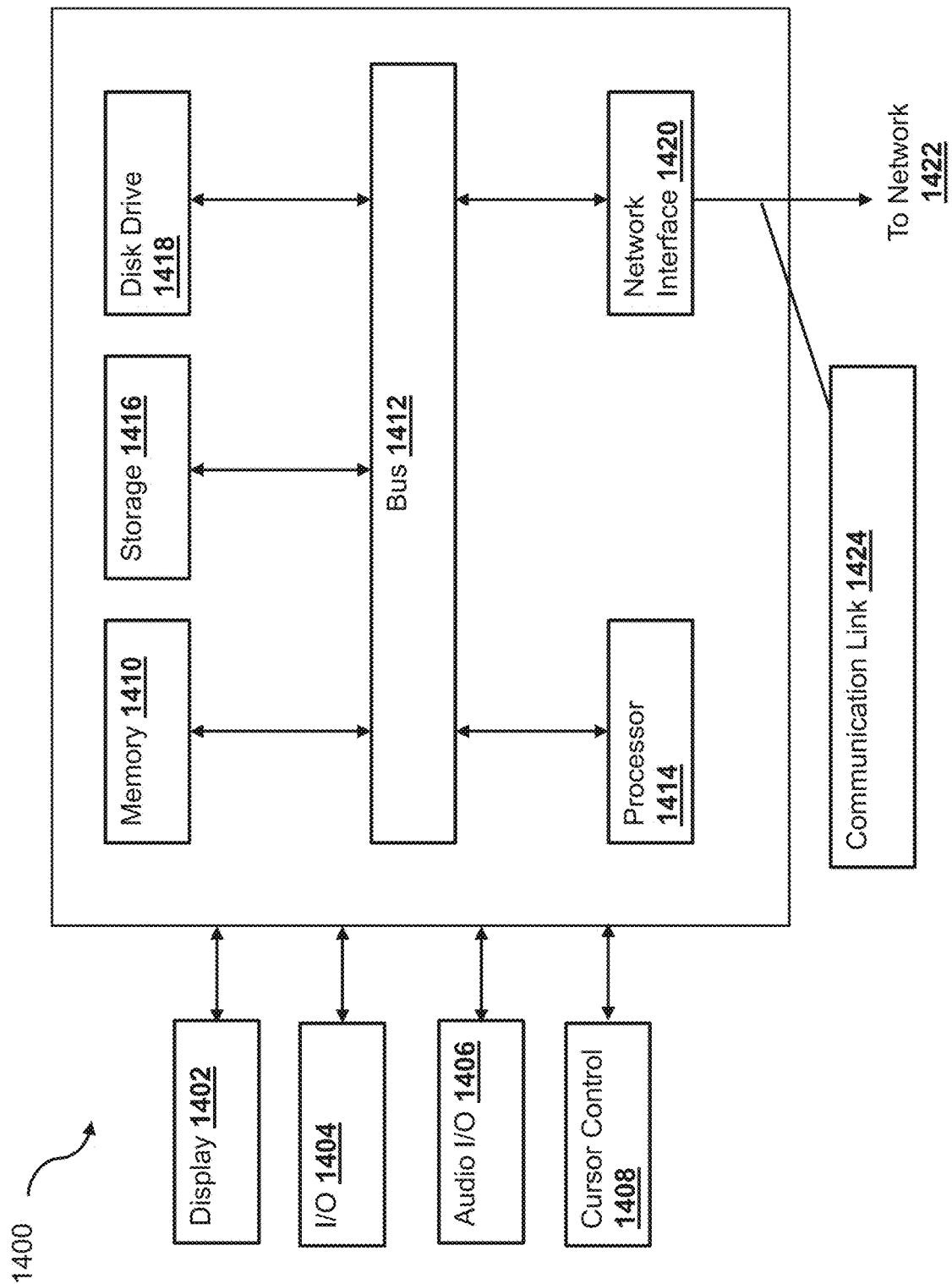
FIG. 14 is a block diagram of a system for implementing a device according to an embodiment of the present disclosure.

FIG. 14 is a block diagram of a computer system 1400 suitable for implementing one or more embodiments of the present disclosure, including the service provider server 130, the merchant server 120, the user devices 110, 180, and 190, and the device 150. In various implementations, each of the devices 110, 150, 180, and 190 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices/servers 110, 120, 130, 150, 180, and 190 may be implemented as the computer system 1400 in a manner as follows.

The computer system 1400 includes a bus 1412 or other communication mechanism for communicating information data, signals, and information between various components of the computer system 1400. The components include an input/output (I/O) component 1404 that processes a user (i.e., sender, recipient, service provider) action, such as selecting keys from a keypad/keyboard, selecting one or more buttons or links, etc., and sends a corresponding signal to the bus 1412. The I/O component 1404 may also include an output component, such as a display 1402 and a cursor control 1408 (such as a keyboard, keypad, mouse, etc.). The display 1402 may be configured to present a login page for logging into a user account or a checkout page for purchasing an item from a merchant. An optional audio input/output component 1406 may also be included to allow a user to use voice for inputting information by converting audio signals. The audio I/O component 1406 may allow the user to hear audio. A transceiver or network interface 1420 transmits and receives signals between the computer system 1400 and other devices, such as another user device, a merchant server, or a service provider server via a network 1422, such as network 160 of FIG. 1. In one embodiment, the transmission is wireless, although other transmission mediums and methods may also be suitable. A processor 1414, which can be a micro-controller, digital signal processor (DSP), or other processing component, processes these various signals, such as for display on the computer system 1400 or transmission to other devices via a communication link 1424. The processor 1414 may also control transmission of information, such as cookies or IP addresses, to other devices.

The components of the computer system 1400 also include a system memory component 1410 (e.g., RAM), a static storage component 1416 (e.g., ROM), and/or a disk drive 1418 (e.g., a solid-state drive, a hard drive). The computer system 1400 performs specific operations by the processor 1414 and other components by executing one or more sequences of instructions contained in the system memory component 1410. For example, the processor 1414 can perform the transaction analysis functionalities described herein according to the processes 1200 and 1300.

Logic may be encoded in a computer readable medium, which may refer to any medium that participates in providing instructions to the processor 1414 for execution. Such a medium may take many forms, including but not limited to, non-volatile media, volatile media, and transmission media. In various implementations, non-volatile media includes optical or magnetic disks, volatile media includes dynamic memory, such as the system memory component 1410, and transmission media includes coaxial cables, copper wire, and fiber optics, including wires that comprise the bus 1412. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1400. In various other embodiments of the present disclosure, a plurality of computer systems 1400 coupled by the communication link 1424 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled with the non-transitory memory and configured to read instructions from the non-transitory memory to cause the system to perform operations comprising:
   displaying, on a computer device, a presentation of a graph comprising nodes connected with each other via directional edges, wherein the presentation has a non-hierarchical structure;
   selecting, from the nodes of the graph, a seed node;
   assigning each of the nodes in the graph to one of a plurality of layers within a layered hierarchical structure based on a traversal of the graph from the seed node;
   iteratively identifying a node from the graph and determining whether to reassign the node to a different layer in the plurality of layers within the layered hierarchical structure based on a goal of minimizing reverse edges in the graph;
   transforming the graph based on the layered hierarchical structure;
   detecting a pattern of activities corresponding to a subset of nodes from the graph based on analyzing the transformed graph; and
   presenting the transformed graph on the computer device, wherein the subset of nodes is presented differently from other nodes in the graph based on the detected pattern of activities.

2. The system of claim 1, wherein the transforming the graph comprises re-arranging the nodes in the graph based on the layers assigned to the nodes in the layered hierarchical structure.

3. The system of claim 1, wherein the operations further comprise:
determining that the detected pattern of activities corresponds to one of a plurality of pre-determined patterns of activities.

4. The system of claim 1, wherein the presenting the transformed graph comprises highlighting the subset of nodes, but not the other nodes, in the graph.

5. The system of claim 1, wherein each node in the graph represents a user account with a service provider, wherein each directional edge in the graph represents a directional transaction between two user accounts, and wherein the operations further comprise:
determining that one or more user accounts corresponding to the subset of nodes are involved in a particular type of activity based on the detected pattern of activities; and
performing an action to the one or more user accounts.

6. The system of claim 5, wherein the action comprises at least one of modifying an access level associated with the one or more user accounts, modifying an authentication requirement for accessing the one or more user accounts, or restricting the one or more user accounts from being used to conduct transactions.

7. The system of claim 1, wherein the assigning each of the nodes in the graph to the one of the plurality of layers within the layered hierarchical structure comprises:
performing a breadth-first search (BFS) on the graph starting from the seed node according to the directional edges in the graph;
determining, for a first node in the graph, a particular level corresponding to a search level that the first node is traversed during the BFS; and
assigning the first node to the particular level.

8. A method, comprising:
accessing, by one or more hardware processors, a graph comprising nodes connected with each other via directed edges;
determining, by the one or more hardware processors and from the nodes of the graph, a seed node;
assigning each of the nodes in the graph to a corresponding layer in a plurality of layers within a layered hierarchical structure based on a traversal of the graph from the seed node;
iteratively identifying a node from the graph and determining whether to reassign the node to a different layer in the plurality of layers within the layered hierarchical structure based on a goal of minimizing reverse edges in the graph;
transforming the graph based on the layered hierarchical structure;
detecting a pattern of activities corresponding to a subset of nodes from the graph based on analyzing the transformed graph; and
presenting, by the one or more hardware processors, the transformed graph on a computer device, wherein the subset of nodes is presented differently from other nodes in the graph based on the detected pattern of activities.

9. The method of claim 8, further comprising:
selecting, from the graph, a first node from a first layer in the layered hierarchical structure;
generating a plurality of configurations based on provisionally re-assigning the first node to different layers in the plurality of layers of the layered hierarchical structure;
determining, for each configuration in the plurality of configurations, a number of reverse edges in the graph; and
determining whether to move the first node from the first layer to a second layer in the plurality of layers based on the numbers of reverse edges corresponding to the plurality of configurations.

10. The method of claim 9, further comprising:
selecting, for first node and from the plurality of configurations, a particular configuration having a lowest number of reverse edges.

11. The method of claim 9, wherein the generating the plurality of configurations comprises inserting an additional layer between two existing layers in the layered hierarchical structure.

12. The method of claim 9, wherein the generating the plurality of configurations comprises inserting an additional layer before a lowest layer in the layered hierarchical structure.

13. The method of claim 10, further comprising:
re-assigning the first node from the first layer to a particular layer corresponding to the particular configuration based on the particular configuration having the lowest number of reverse edges.

14. The method of claim 8, wherein the determining the seed node is based on a number of inbound edges connected to each node in the graph, and wherein the seed node has a least number of inbound edges among the nodes of the graph.

15. A non-transitory machine-readable medium having stored thereon machine-readable instructions executable to cause a machine to perform operations comprising:
accessing a graph comprising nodes connected with each other via directional edges;
selecting, from the nodes of the graph, a seed node;
assigning each of the nodes in the graph to a corresponding one of a plurality of layers within a layered hierarchical structure based on a traversal of the graph from the seed node;
iteratively identifying a node from the graph and determining whether to reassign the node to a different layer in the plurality of layers within the layered hierarchical structure based on a goal of minimizing reverse edges in the graph;
transforming the graph based on the layered hierarchical structure;
detecting a pattern of activities corresponding to a subset of nodes from the graph based on analyzing the transformed graph; and
presenting the transformed graph on a computer device, wherein the subset of nodes is presented differently from other nodes in the graph based on the detected pattern of activities.

16. The non-transitory machine-readable medium of claim 15, wherein the transforming the graph comprises re-arranging the nodes in the graph based on the layers assigned to the nodes in the layered hierarchical structure.

17. The non-transitory machine-readable medium of claim 15, wherein the operations further comprise:
determining that the detected pattern of activities corresponds to one of a plurality of pre-determined patterns of activities.

18. The non-transitory machine-readable medium of claim 15, wherein each node in the graph represents a user account with a service provider, wherein each directional edge in the graph represents a directional transaction between two user accounts, and wherein the operations further comprise:

determining that one or more user accounts corresponding to the subset of nodes are involved in a particular type of activity based on the detected pattern of activities; and performing an action to the one or more user accounts.

19. The non-transitory machine-readable medium of claim 18, wherein the action comprises at least one of modifying an access level associated with the one or more user accounts, modifying an authentication requirement for accessing the user accounts, or restricting the one or more user accounts from being used to conduct transactions.

20. The non-transitory machine-readable medium of claim 15, wherein the assigning each of the nodes in the graph to the one of the plurality of layers within the layered hierarchical structure comprises:

performing a breadth-first search (BFS) on the graph starting from the seed node according to the directional edges in the graph;

determining, for a first node in the graph, a particular level corresponding to a search level that the first node is traversed during the BFS; and assigning the first node to the particular level.

\* \* \* \* \*